US008619367B2

(12) United States Patent
Horikawa

(10) Patent No.: US 8,619,367 B2
(45) Date of Patent: *Dec. 31, 2013

(54) DISPLAY APPARATUS, DISPLAY UNIT, ELECTRONIC EQUIPMENT, MOBILE ELECTRONIC EQUIPMENT, MOBILE TELEPHONE, AND IMAGE PICKUP APPARATUS

(75) Inventor: Yoshiaki Horikawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 351 days.

This patent is subject to a terminal disclaimer.

(21) Appl. No.: 13/065,155

(22) Filed: Mar. 14, 2011

(65) Prior Publication Data

US 2011/0317272 A1 Dec. 29, 2011

(30) Foreign Application Priority Data

Mar. 16, 2010 (JP) ................. 2010-058749
Apr. 2, 2010 (JP) ................. 2010-086265

(51) Int. Cl.
G02B 27/10 (2006.01)
G03B 21/56 (2006.01)
G03B 21/60 (2006.01)
G02F 1/1335 (2006.01)

(52) U.S. Cl.
USPC ............. 359/619; 359/443; 359/454; 349/95

(58) Field of Classification Search
USPC .......... 359/618–628, 443, 454–455; 457/162, 457/164, 165, 553–555; 349/95
See application file for complete search history.

(56) References Cited

U.S. PATENT DOCUMENTS

| | | | | |
|---|---|---|---|---|
| 5,353,133 A | * | 10/1994 | Bernkopf | 349/5 |
| 6,215,593 B1 | * | 4/2001 | Bruce | 359/619 |
| 2002/0051118 A1 | * | 5/2002 | Takagi et al. | 351/211 |
| 2004/0085648 A1 | * | 5/2004 | Tomono | 359/631 |
| 2006/0114374 A1 | * | 6/2006 | Segawa et al. | 349/95 |
| 2007/0097277 A1 | * | 5/2007 | Hong et al. | 349/11 |

FOREIGN PATENT DOCUMENTS

| | | |
|---|---|---|
| JP | 3552413 | 5/2004 |
| JP | 2007-128355 | 5/2007 |
| JP | 2009-063624 | 3/2009 |

* cited by examiner

*Primary Examiner* — Dawayne A Pinkney
(74) *Attorney, Agent, or Firm* — Kenyon & Kenyon LLP

(57) ABSTRACT

In a display which includes a plurality of light exit point groups, and a plurality of lenses which project the plurality of light exit point groups, the light exit point group includes at least one light exit point, and each lens is disposed such that an image of the light exit point group is projected to be overlapped, and projected images of the plurality of lenses are formed on a pupil of an eye of an observer by making overlapping of light exit points in the light exit point group which have been overlapped upon being projected by the lenses, incident on a pupil of the eye of the observer.

66 Claims, 29 Drawing Sheets

FIG. 8A
FIG. 8B
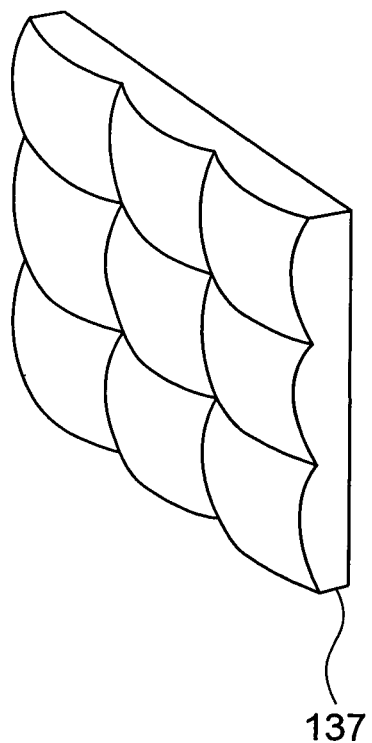
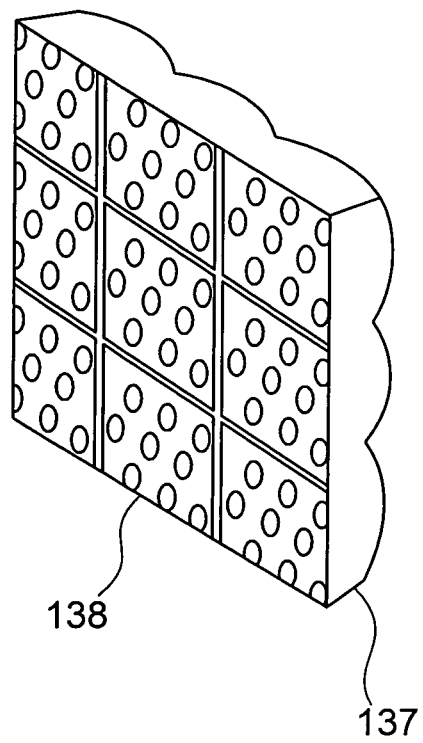
138
137
137

22  23  24

22 23 25 26

22 23 25

22 23 25

DISPLAY APPARATUS, DISPLAY UNIT, ELECTRONIC EQUIPMENT, MOBILE ELECTRONIC EQUIPMENT, MOBILE TELEPHONE, AND IMAGE PICKUP APPARATUS

CROSS-REFERENCE TO RELATED APPLICATION

The present application is based upon and claims the benefit of priority from the prior Japanese Patent Application Nos. 2010-058749 filed on Mar. 16, 2010 and 2010-086265 filed on Apr. 2, 2010; the entire contents of which are incorporated herein by reference.

BACKGROUND OF THE INVENTION

1. Field of the Invention

The present invention relates to a display apparatus, and display unit, an electronic equipment, a mobile electronic equipment, a mobile telephone, and an image pickup apparatus which include the display apparatus.

2. Description of the Related Art

As a display apparatus which displays picture images and characters, display apparatuses such as a liquid crystal display and a plasma display are available. However, in these display apparatuses diopter adjustment is not available. With the aging of society, there is an increase in the number of elderly people having farsightedness due to old age (presbyopia) and a display apparatus, particularly a flat-panel display (FPD) which is capable of diopter adjustment has been sought. With widespread use of mobile telephones and digital cameras, there is an increase in the number of occasions of looking at a display by the FPD outdoor. Furthermore, a use of electronic books instead of paper books has been increasing. It is extremely cumbersome to put on or take off reading glasses every time at the time of looking at the FPD of a mobile equipment such as a mobile telephone and a digital camera.

There have been more occasions of looking at the FPD of a mobile telephone in situations such as using mail and games, rather than using as a telephone. Moreover, in a digital single-lens reflex camera, the FPD is used as a live-view monitor, and in this digital single-lens reflex camera, it is not practical to put on or take off reading glasses (hereinafter, 'to use reading glasses') every time for looking the live-view monitor while looking at a distant object. Furthermore, necessity of looking at a monitor is increasing because a GUI (Graphical user interface) is usually used through the monitor for an operation such as changing shooting moods.

Moreover, at the time of looking at a monitor of a car navigation system, an observer is busy driving a car. Therefore, it is dangerous to put on and take off the reading glasses, and putting on and taking off the reading glasses is practically impossible. In other situations such as while observing a liquid crystal screen of a personal computer (PC), it is cumbersome for an observer to put on the reading glasses every time. Consequently, an electronic equipment in which it is possible to see a monitor without putting on the reading glasses has been sought.

Namely, a FDP have not existed in which a just focused image could be observed regardless of whether the reading glasses is used. Moreover, there has been no electronic equipment with such monitor mounted. However, such problems have been pointed out recently, and in Japanese Patent No. 3552413, a method of displaying a corrected picture image subjected to an edge enhancement has been proposed. Moreover, in Japanese Patent Application Laid-open Publication No. 2007-128355, a method of using pre-corrected picture image generated by an inverse matrix of Toeplitz matrix has been proposed. Furthermore, in Japanese Patent Application Laid-open Publication No. 2009-63624, a method of using a magnifying lens (loupe) has been proposed.

SUMMARY OF THE INVENTION

According to a first aspect of the present invention, there is provided a display apparatus, including
a plurality of light exit point groups, and
a plurality of lenses which project the plurality of light exit point groups, and
the light exit point group includes at least one light exit point, and
each lens is disposed such that an image of the light exit point groups is projected to be overlapped, and
projected images of the plurality of lenses are formed on a retina of an eye of an observer by making overlapping of light exit points in the light exit point groups, which have been projected by the lenses to be overlapped, incident on a pupil of the eye of the observer.

According to a second aspect of the present invention, there is provided a display unit including
a plurality of aperture groups, and
a plurality of lenses which project the aperture groups, and
the aperture group has at least one aperture, and
each lens is disposed such that an image of the aperture groups is projected to be overlapped, and
projected images of the plurality of lenses are formed on a retina of an eye of an observer by making overlapping of apertures in the aperture groups, which have been projected by the lenses to be overlapped, incident on a pupil of the eye of the observer.

According to a third aspect of the present invention, there is provided an electronic equipment including
a display apparatus according to the first aspect of the present invention.

According to a fourth aspect of the present invention, there is provided a mobile electronic equipment including
the display apparatus according to the first aspect of the present invention.

According to a fifth aspect of the present invention, there is provided a mobile telephone including
the display apparatus according to the first aspect of the present invention.

According to a sixth aspect of the present invention, there is provided an image pickup apparatus including
a display apparatus according to the first aspect of the present invention.

BRIEF DESCRIPTION OF THE DRAWINGS

FIG. 8A is a perspective view as seen from a lens side, showing a structure of light exit point groups and a micro lens array of a display unit according to a fourth embodiment of the present invention, and FIG. 8B is a perspective view as seen from a light exit point group side, showing the structure of the light exit point groups and the micro lens array of the display unit according to the fourth embodiment;

DETAILED DESCRIPTION OF THE PREFERRED EMBODIMENTS

Exemplary embodiments of a display apparatus, a display unit, an electronic equipment, a mobile telephone, and an image pickup apparatus according to the present invention will be described below by referring to the accompanying diagrams. However, the present invention is not restricted to the embodiments described below.

It is well known that a depth of field increases when the diaphragm of a lens in a camera is narrowed, and that a picture in focus from a near point to a distant point can be obtained. Therefore, by increasing the depth of field by artificially narrowing a pupil of an eye, it is possible to focus at a near point at where it is difficult to focus for a presbyopic eye (farsightedness due to old age). The present invention provides a display apparatus in which a pupil of an eye is narrowed equivalently, and a display unit, an electronic equipment, a mobile telephone, and an image pickup apparatus in which, such display apparatus has been mounted.

(First Embodiment)

Figure 1:
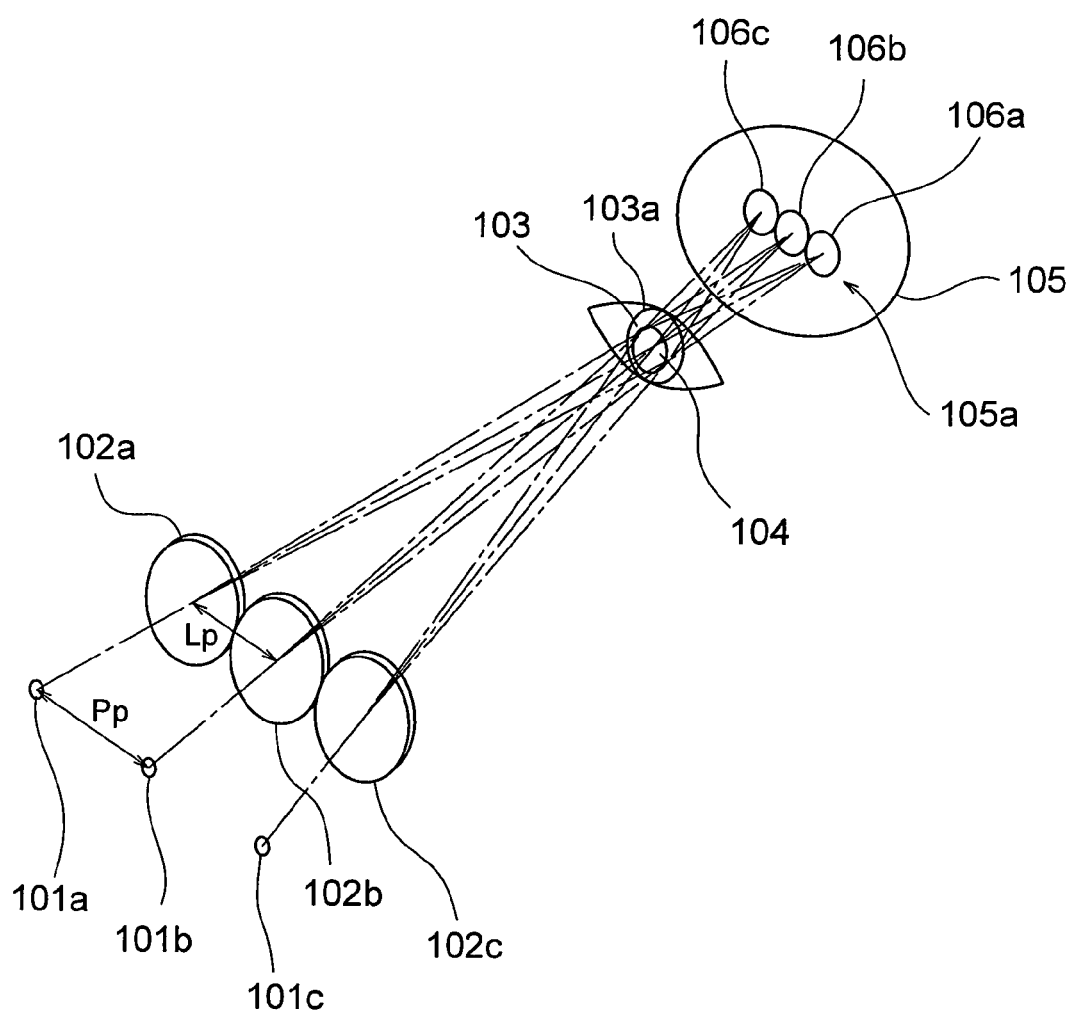
FIG. 1 is a perspective view showing a structure of a display apparatus according to a first embodiment of the present invention.

FIG. 1 shows a concept of a display method according to the present invention. FIG. 1 is a perspective view showing a structure of a display apparatus according to a first embodiment. In FIG. 1, a lens 103 is a lens of an eye of a person who observes a display (an observer), and 103a denotes a pupil of the eye 103. As a matter of course, the pupil 103a is an aperture of the lens 103 of the eye. Moreover, 101a, 101b and 101c denote a light exit point group. The light exit point group may include at least one light exit point. In FIG. 1, since each of the light exist point group 101a, 101b and 101c includes one light exit point, the description will be made by calling the light exit point group as a light exit point. The display includes the light exit points 101a, 101b, 101c and lenses 102a, 102b, and 102c.

Light emerged from the light exit points 101a, 101b, and 101c is projected on the pupil 103a by the lenses 102a, 102b and 102c so that images of respective lights are overlapped. Therefore, the interval (a periodical pitch) of the lenses 102a, 102b, and 102c is to be set such that the light emerged from each of the light exit points 101a, 101b and 101c is overlapped at a position of the pupil 103a. Namely, as it is evident from FIG. 1, the ratio of the interval of the lenses to the interval of the light exit points is set to be the ratio of the distance between the pupil 103a and the lens 102b to the distance between the pupil 103a and the light exit point 101b. The size 104 of an image of the light exit points 101a, 101b and 101c projected on the pupil 103a is to be set to be smaller than namely, within a diameter of the pupil 103a. In other words, light beam (the size 104) passing through the pupil 103a is smaller than the pupil 103a.

Moreover, the lenses 102a, 102b and 102c are projected on a retina 105 by the lens 103 of the eye and their images 106a, 106b and 106c are formed. When the lenses 102a, 102b and 102c are assumed to be pixels, the lens images 106a, 106b and 106c become images of pixels. When a signal of a picture image (i.e. video signal) is imparted to the light exit points 101a, 101b, and 101c, it is possible to see an image.

In the case of eyes of a farsighted person due to old age (a presbyopic person), focus is not on the retina 105. However, since a light beam (the size 104) smaller than the pupil 103 is used for image formation of the lenses 102a, 102b and 102c which are assumed as pixels, an image having a deep depth of focus is formed. Therefore, the observer is able to a focused image easily. This will be described later by using FIG. 3A, FIG. 3B and FIG. 3C.

Figure 2:
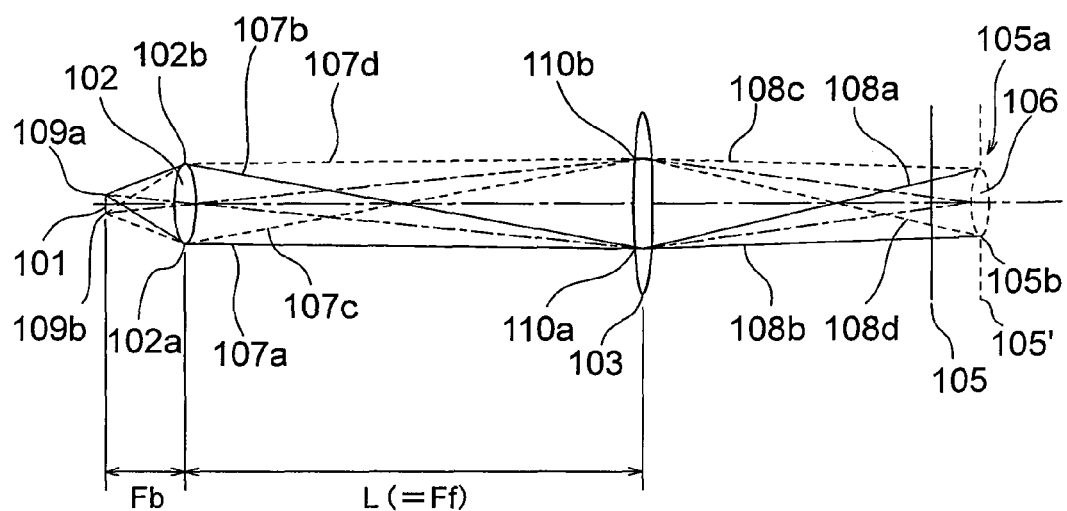
FIG. 2 is a diagram showing an optical system of the display apparatus according to the first embodiment.

Next, each image formation for the light exit points 101 and the lenses 102 will be described below by using FIG. 2. FIG. 2 is a diagram showing a part of an optical system of the display apparatus according to the first embodiment. Here, the light exit point 101 is one of the light exit points 101a, 101b, and 101c (FIG. 1), and the lens 102 is one of the lenses 102a, 102b, and 102c (FIG. 1).

In FIG. 2, the light exit point 101 is shown as a micro area having a finite area. The light exit point 101 is projected on the lens 103 of the eye by the lens 102. Light which has emerged from a point 109a on the light exit point 101 becomes a light beam shown by light beams 107a and 107b (solid lines) after passing through the lens 102. Then an image 110a of the point 109a is formed on the lens 103 of the eye by the light beams 107a and 107b. At the same time light which has emerged from a point 109b on the light exit point 101 becomes a light beam shown by light beams 107c and 107d (dashed lines) after passing through the lens 102. That is, an image 110b of the point 109b is formed on the lens 103 of the eye by the light beams 107c and 107d.

On the other hand, the lens 102 is formed as an image in the proximity 105' of the retina 105 by the lens 103 of the eye. Concretely, the point 102a of the lens 102 is formed as an image in the proximity 105a as shown by the light beams 107a, 108a, 107c and 108c. At the same time, the point 102b of the lens 102 is formed as an image in the proximity 105b as shown by light beams 107b, 108b, 107d and 108d. In this manner, an image 106 of the lens 102 is formed in the proximity 105' of the retina 105.

Let Ff be a distance between an image of the light exit point group and the lens 102 and let Fb be a distance between the lens 102 and the light exit point 101. When let F be a focal length of the lens 2 (102), the following expression (1-4) holds true.

$$1/Ff + 1/Fb = 1/F \quad (1\text{-}4)$$

In FIG. 1, when let Pp be an interval of repeating of the adjacent light exit points 101a, 101b and 101c (or the light exit point group that will be described later) and let Lp be an interval of repeating of the adjacent lenses 102a, 102b and 102c (correspond to lenses of a micro lens array that will be described later), Pp and Lp satisfy the following expression (1-5).

$$Lp/Pp = Ff/(Ff+Fb) = (Ff-F)/Ff \quad (1\text{-}5)$$

However, a focal length of the lens 102 is so short that a focal depth of the image 104 of the light exit point projected on the pupil 103a of the observer's eye becomes deep. When the focal length is short with the same image forming distance, a magnification becomes high. As the magnification becomes high, since a NA (numerical aperture) of an image side becomes extremely small, the focal depth becomes deep. For instance, in a numerical example of a second embodiment which will be described later, it will be indicated that projecting images of light exit points 123a, 123b and 123c (light exit point groups 121a, 121b and 121c) 300 mm ahead and projecting them at infinity are equivalent when the focal length of the lenses 102a, 102b and 102c are small.

Consequently, it can be considered that it is equivalent to the light exit point is at infinity, and even when a diameter of a light beam entering the pupil is not smaller than a diameter of the pupil, the observer can see a focused image.

Moreover, It is not always necessary to focus on the pupil 103a accurately. Consequently, as shown in FIG. 2, although it is ideal that the distance L between the lens 102 and the lens 103 of the observer's eye is the same as the distance Ff between the lens 102 and the image of the light exit point group, it is not necessary that the two distances L and Ff are the same. Consequently, although, Ff=L, or in other words, Lp/Pp=L/(L+Fb) ideally, the following expression (1-2) is acceptable.

$$-L/2 \leq Ff \leq \infty \quad (1\text{-}2)$$

This interval may differ for a vertical direction and a horizontal direction of the display apparatus. This will be described in detail in a third embodiment.

Figure 3A:
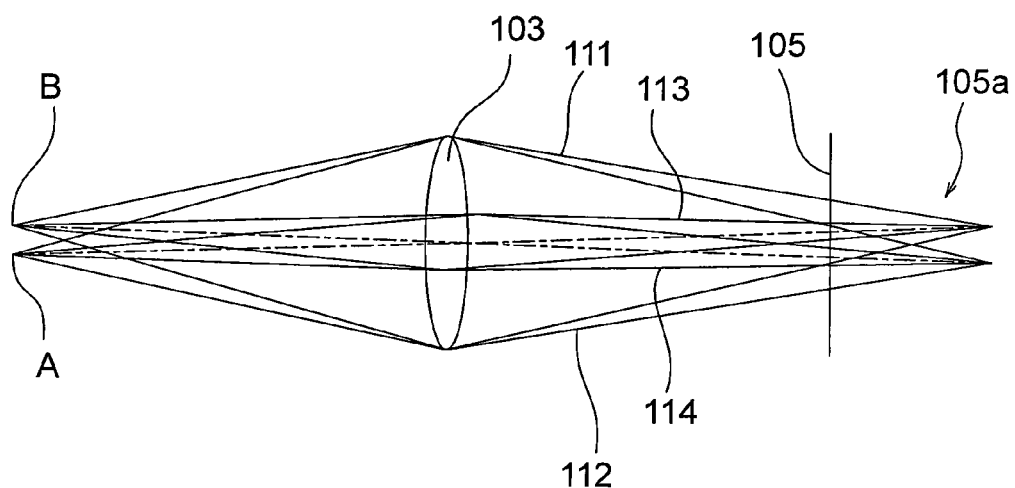
FIG. 3A, FIG. 3B, and FIG. 3C show diagrams that compare the image formed by a light beam passed through an entire pupil of a an eye with the image formed by a light beam smaller than the pupil.
Figure 3B:
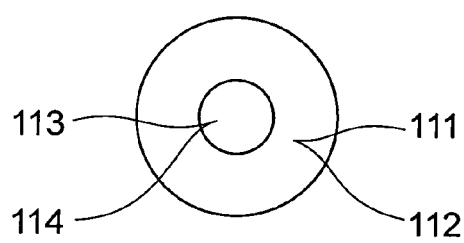
Figure 3C:
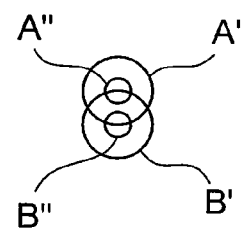

Forming an image (of the size 104) of a light exit point which is smaller than the pupil has an effect equivalent to an effect of narrowing the pupil, and this will be described below by using FIG. 3A, FIG. 3B and FIG. 3C. The case in which the observer observes a point A and a point B is taken into consideration. In the case of farsightedness due to old age (presbyopic eye), since a refracting power of the lens 103 of the eye is weak, it is not possible to focus on the retina. Consequently, since the images of the point A and the point B formed by light beams 111 and 112 which have passed through the lens 103 of the entire pupil are spread as A' and B' respectively on the retina 105, it is not possible to see the images in focus. Besides, since A' and B' are partially overlapped, the observer cannot identify A' and B' separately. Consequently, the observer cannot see resolved images.

Whereas, since images of the point A and point B which are formed by light beams 113 and 114 smaller than the pupil become small as A" and B" respectively on a retina 6, it is possible to see the images more in focus as compared to A' and B'. Furthermore, since A" and B" do not overlap at all, the observer can identify A" and B" separately. In other words, the observer can see resolved images. A display method according to the first embodiment is the method of increasing a depth of field by bringing the pupil in a narrowed state equivalently by making a light beam thinner than the pupil incident on the pupil.

In FIG. 1, the light exit points 101a, 101b, and 101c are nothing but light emitting points in a case of a self emitting element such as an organic EL (electro-luminescence). In a case of a transmission-type by a back light, such as a liquid crystal panel, the light exit point is a light transmission point restricted (controlled) by an aperture portion. The light exit point and the light transmission point are not necessarily points and may be an area (portion) having a finite area. Moreover, it is preferable that the light exit point and the light transmission point have a circular shape as in FIG. 1, but may not be necessarily round.

In the first embodiment, the lenses 102a, 102b, and 102c are considered to be pixels. Therefore, pixels of a flat panel display (FPD) such as a normal LCD (liquid crystal display) and an organic electro-luminescence (OEL) are distinguished from pixels (lenses) of the first embodiment and are called as information pixels. These information pixels may be associated with the light exit points on one-to-one basis, or a plurality of light exit points may be provided for one information pixel. An example of providing the plurality of light exit points to one information pixel will be described in the third embodiment. Even in the following embodiments, pixels of a FPD are called as information pixels.

A normal FPD such as an LCD and an organic electro-luminescence (OEL) sometimes makes a color display by composing one information pixel by sub-information pixels of R (red), G (green), and B (blue). By associating the light exit points 101a, 101b and 101c with the sub-information pixels, a color display of RGB is possible.

In the display apparatus according to the first embodiment, since the light beam (size 104) having a diameter smaller than the pupil 103a is made to be incident on the pupil 103a, brightness is reduced by the amount equivalent to the reduction in the diameter of the light beam. For compensating the reduced brightness, it is desirable to increase luminance of the information pixels, for example, to increase a luminance (brightness) of the organic electro-luminescence or to increase a luminance (brightness) of the liquid crystal panel. When a liquid crystal device has been used for the information pixels, it is desirable to use an LED (light emitting diode) or an LD (laser diode) as a backlight source.

The display apparatus according to the first embodiment has a feature that the depth of field of the observer's eye is increased by making the diameter of the light beam 104 incident on the pupil 103a of the observer smaller than the diameter of the pupil 103a. As a result, the display apparatus according to the first embodiment shows an effect that the observer is able to see a focused display easily (not only a picture etc. but all the information that is displayed, such as characters). Concretely, even a farsighted person due to old age can see a focused display easily without using reading glasses. Moreover, since the display apparatus according to the first embodiment has the abovementioned effect, it is possible to reduce a load on eyes of the observer.

Moreover, when the display apparatus according to the first embodiment is used in a mobile telephone, an image pickup apparatus (such as a digital camera) and an electronic equipment (such as an electronic book and other mobile equipments, a car navigation system, and a monitor screen of a personal computer), even a farsighted person due to old age (presbyopic person) can see a focused display without using reading glasses. Furthermore, even a farsighted person due to old age and a nearsighted person can see a focused display without using glasses. Consequently, in an electronic equipment according to the first embodiment, even a farsighted person due to old age, a nearsighted person, or an astigmatic person having a difficulty in seeing a display in a normal electronic equipment is able to see a focused display. Therefore, as a result, it is possible to understand the display content and to operate the electronic equipment accurately.

(Second Embodiment)

Figure 4:
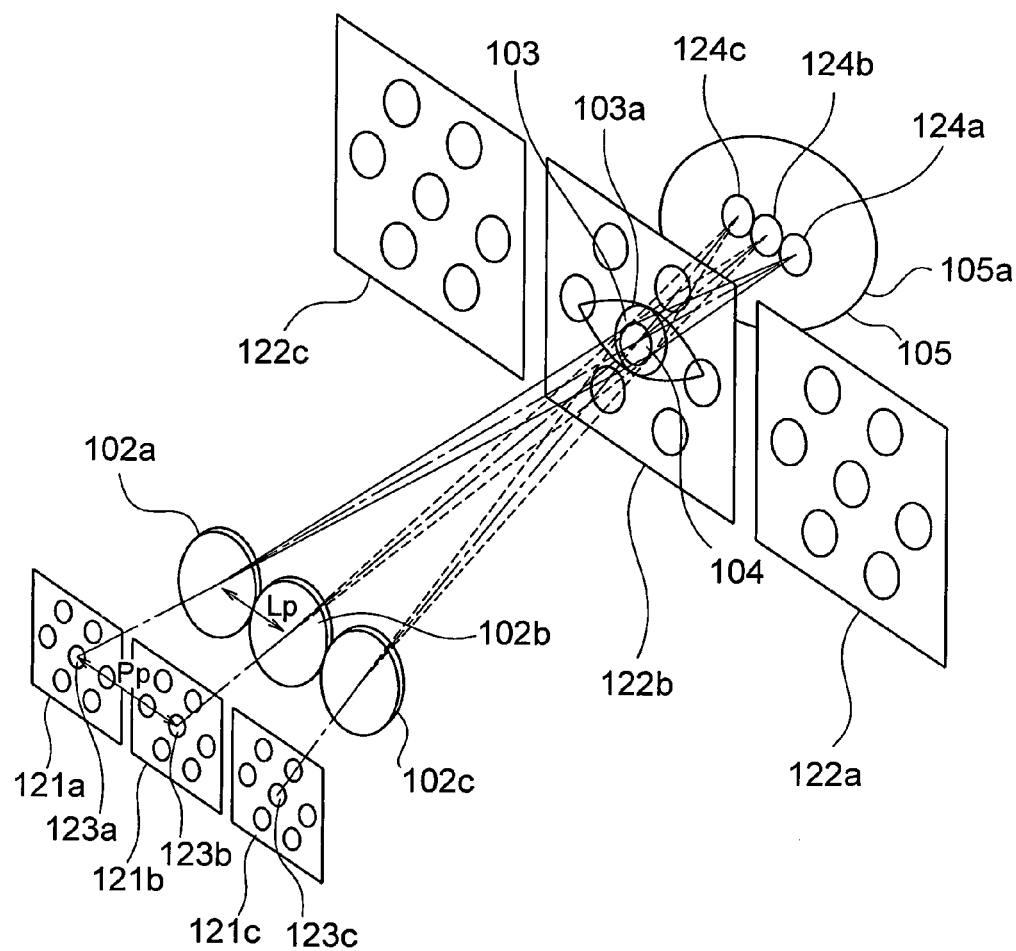
FIG. 4 is a perspective view showing a structure of a display apparatus according to a second embodiment of the present invention.

FIG. 4 is a perspective view showing a structure of a display apparatus according to the second embodiment of the present invention. The display apparatus according to the second embodiment includes the lenses 102a, 102b and 102c, and the light exit point groups 121a, 121b and 121c. The light exit point groups 121a, 121b and 121c include a plurality of light exit points 123a, 123b and 123c respectively. Moreover, the light exit point groups 121a, 121b and 121c correspond to information pixels or sub-information pixels. Although the light exit point groups 121a, 121b and 121c seem to be associating with the lenses 102a, 102b and 102c on one-to-one basis, when the observer's pupil is at a position of a light exit point group image 122a, the light exit point groups 121a and 121b correspond to the lenses 102b and 102c. The number of light exit points in each light exit point group may be one as in the first embodiment. Moreover, same reference numerals are assigned to members which are similar as in the display apparatus according to the first embodiment and description in detail of such components is omitted.

Each of the light exit point groups 121a, 121b and 121c is projected by the lens 102b. Accordingly, light exit point group images 122a, 122b and 122c are formed (FIG. 4). Moreover, the light exit point group 121a is projected on a position of the light exit point group image 122b and the light exit point group 121b is projected on a position of the light exit point group image 122c by the lens 102a. Furthermore, the light exit point group 121b is projected on a position of the light exit point group image 122a and the light exit point group 121c is projected on a position of the light exit point group image 122b by the lens 102c. Even in the display apparatus according to the second embodiment, image of the light exit points 123a, 123b and 123c are projected to be overlapped on the pupil 103a by the lenses 102a, 102b and 102c. Moreover, projected images 124a, 124b and 124c of the lenses 102a, 102b and 102c are formed on a retina by the lens 103 of the pupil. A relationship between the interval Pp of the light exit point groups 121a, 121b and 121c and the interval Lp of the lenses 102a, 102b and 102c satisfy the following expression (1-5).

$$Lp/Pp=Ff/(Ff+Fb)=(Ff-F)/Ff \qquad (1\text{-}5)$$

where,

Ff denotes a distance from the lens 102b up to the image 122b of the light exit point group, Fb denotes a distance between the light exit point group 121b and the lens 102b, and F denotes a focal length of the lens 102b.

When the light exit point groups 121a, 121b and 121c are associated with R (red), G (green) and B (blue) respectively, the observer can observe a color image. The diagram is drawn as if there is a gap between the light exit point groups, which is for the sake of description, and it is needless to mention that practically there is no gap which is unnecessary.

Figure 5A:
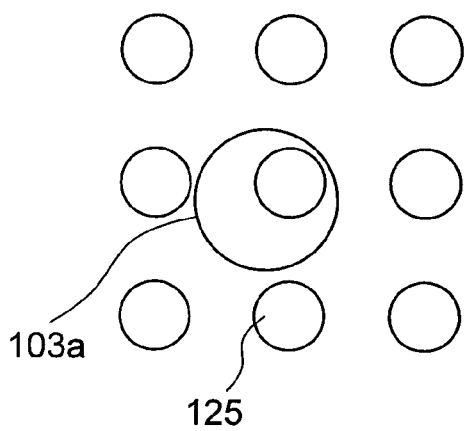
FIG. 5A and FIG. 5B are diagrams showing a state in which a plurality of light exit points is projected on a pupil of an observer.
Figure 5B:
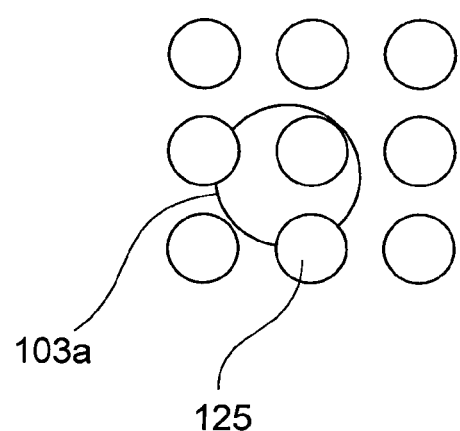

FIG. 5A and FIG. 5B are diagrams showing projected images which are formed by the light exit points (123a, 123b and 123c in FIG. 4) being projected on the pupil 103a of the observer. In FIG. 5A and FIG. 5B, the description will be made assuming that the light exit point 123a in FIG. 4 has been projected. Moreover, a projected image 125 is an image of the light exit point 123a on the pupil 103.

As shown in FIG. 5A, when the projected image 125 on the pupil 103 is of an appropriate size with respect to the pupil 103a of the observer's eye, an image of one light exit point (an image in a size smaller than the pupil 103a) is formed on the pupil 103a. In this case, since a light beam smaller than the pupil enters, there is an effect of increase in the depth of field. In FIG. 5A, the projected image 125 on the pupil 103a of the light exit point corresponds to a size of the light beams 113 and 114 on the pupil 103a in FIG. 3A and FIG. 3B, and also corresponds to spreading on the retina 105.

Whereas, when a location and a size of the projected image 125 are not appropriate, light beams from a plurality of light exit points enter the pupil 103a simultaneously and then the effect of increase in the depth of field is inhibited. In FIG. 5B, although the number of light beams incident on the pupil (images of light exit points formed on the pupil) is four, the number of beams incident on it perfectly is one and the effect of increase in the depth of field is not inhibited. Therefore, it is desirable to locate the light exit points such that the number of light beams incident on the pupil 103a (projected images of the light exit points formed on the pupil) is four or less. The light exit point group, in the case of an organic electro-luminescence display device, is a light emitting pattern of information pixels, and in the case of a liquid crystal display device, is a light transmission point group provided to the information pixels.

At the time of projecting the light exit points, at least one light exit point is projected inside the pupil 103a. For increasing the depth of field, it is desirable that the diameter of a light beam incident on the pupil 103a of the observer, or in other words, a size of the projected image 125, is smaller than the diameter of the pupil 103a. When the projected image of the light exit point by the lens is smaller than the diameter of the pupil, it takes an effect in which the depth of field is increased. If the diameter of the pupil 103 in a case of a normal brightness is let to be about 3 mm, it is preferable that the diameter of the light beam (size, diameter of the image of the light exit point) is 2.8 mm or less for increasing the depth of field.

Whereas, when the diameter of the light beam from the light exit point becomes small, a resolving power of the eye is degraded.

When let Φ be the diameter of the light beam, and let λ be a wavelength, an angular resolving power θ of the eye is calculated by the following expression (1-6).

$$\theta = \lambda/\Phi \quad (1\text{-}6)$$

Accordingly, the resolving power (a diffraction limit) of 2 mm diameter of a light beam corresponds to almost an eyesight of 1.0 (wavelength 0.55 μm). In contrast, if the light beam is narrowed to 1 mm, the eyesight is degraded to 0.5. However, there is a resolving power of about 0.17 at a point 300 m from the observer. Accordingly, there is, no problem. When the diameter of the light beam is narrowed up to 0.5 mm, the eyesight is degraded up to 0.25. The resolving power 300 mm ahead is degraded to 0.33 mm. With this level, it is somewhat possible to see characters of about 3 mm. However, when the diameter of the light beam is narrowed up to 0.2 mm, the eyesight is degraded to 0.1, and the resolving power 300 mm ahead is degraded to 0.9 mm. Consequently, the diameter of the light beam can be narrowed down to about 0.5 mm at the least.

Sometimes, an intensity distribution of a projected image of a light exit point is not clear due to factors such as diffraction. Moreover, it is also possible to let a distribution of brightness of a light exit point to be Gaussian distribution as in laser. When a boundary of a projected image is not clear in such manner, the size of the projected image can be considered to be full width at half maximum equivalently.

The distance at which a farsighted person due to old age has a difficulty in seeing an object is a short distance in many cases. Therefore, in order that it is easy to see an object at a distance of about 300 mm, it is preferable to project an image of the light exit point 300 mm ahead assuming the distance up to the observer to be 300 mm. For having the effect of increase in the depth of field, it is desirable that a projected size of the light exit point is not more than the pupil diameter. Since the pupil diameter at the time of normal brightness is about 3 mm, it is desirable that the size of the image of the light exit point (diameter of light beam) is smaller than 3 mm, or in other words, 2.8 mm or less.

Since each of the diameter of lens corresponds to the size of a pixel, 500 μm or smaller is preferable for a highly defined display. Furthermore, the resolving power, when a person having an eyesight of 1.0 sees an object 300 mm away, is approximately 0.1 mm and it is preferable that the size (a diameter or a length of one side) of the lenses (lenses 102a, 102b, and 102c) is half of that, which is 0.05 mm, or in other words, about 50 μm. However, on the other hand, it is necessary to take into consideration spreading of a light beam due to diffraction, as well.

A spreading angle φ by diffraction, when let the size of the aperture (a diameter or a length of one side) be D, is substantially expressed by the following expression (1-7)

$$\phi = \lambda/D \quad (1\text{-}7)$$

Then, the size φ of the light beam at distance Z is spread as shown by the following expression (1-8).

$$\phi = \lambda Z/D \quad (1\text{-}8)$$

Therefore, when D=50 μm, φ becomes 3.3 mm and it is revealed that an effect of narrowing the pupil equivalently by the light beam almost ceases. Consequently, it is preferable that the size of the lens is 50 μm or more. Besides, the size of the lens for maintaining the size of the light beam to be 1 mm on the pupil is 165 μm when the distance of observation is 300 mm. Accordingly, it is desirable that the size of the lens is in a range of 50 μm to 500 μm.

Figure 6:
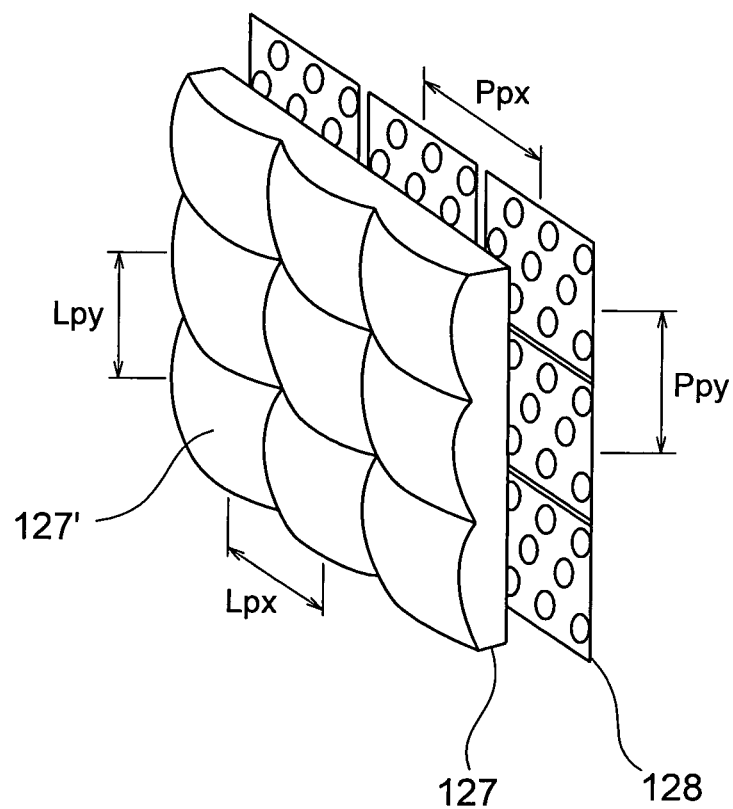
FIG. 6 is a perspective view showing light exit point groups and a micro lens array of the display apparatus according to the second embodiment.

In FIG. 6, a display apparatus according to a modified embodiment of the display apparatus of the second embodiment is shown. FIG. 6 is a diagram in which the lenses 102a, 102b and 102c in FIG. 4 are formed in a micro lens array. In FIG. 6, for simplifying, pixels (lenses) of 3×3 are shown.

The display apparatus according to the modified embodiment of the second embodiment includes a micro lens array 127 and a light exit point group 128. The micro lens array 127 includes a plurality of lenses 127'. The light exit point groups 128 are in plurality and each of the light exit point groups 128 is provided corresponding to the lens 127'.

Letting intervals of the light exit point groups 121a, 121b and 121c (correspond to normal information pixels) be Ppx and Ppy, intervals Lpx and Lpy between the lenses of the micro lens array 127 satisfy the following expression (1-9) and expression (1-10).

$$Lpx = Ppx\, Ff/(Ff+Fb) = Ppx(Ff-F)/Ff \quad (1\text{-}9)$$

$$Lpy = Ppy\, Ff/(Ff+Fb) = Ppy(Ff-F)/Ff \quad (1\text{-}10)$$

Here,

Ff denotes the distance from the lens 102b up to the light exit point group image 122b, Fb denotes the distance between the light exit point group 128 and the lens 127', and F denotes the focal length of the lens 102b.

Moreover, when the light exit point group 128 satisfies expressions (1-9) and (1-10), there is no restriction on relative positions of the micro lenses. Even there is some shift to left or right, no problem occurs. However, if there is a tilt in a lens plane, when the light exit point has been projected near the pupil of the eye of the observer, the projected images are not overlapped. Therefore, it is desirable that the tilt is small.

When a liquid crystal panel is used as a display device, each light exit point group corresponds to each information pixel. In the case of an organic electro-luminescence device, it is possible to form the light exit point groups 128 by the organic electro-luminescence device.

Rest of the structure, action and effect thereof are similar as in the first embodiment.

A numerical example of the second embodiment is shown below. A lens in the numerical example indicates the lenses 102a, 102b and 102c in the case of FIG. 4 and indicates the lens 127' in the case of FIG. 6.

If a distance up to the observer is Fb and a projection magnification by the lens is m, a distance between the lens and the light exit point (a rear focal point position) Fb becomes Fb=Ff/m and a focal length of the lens F becomes Fb×Ff/(Ff+Fb). An ideal case (Ff=L), in which the distance L from the lens up to the lens of the eye, or in other words, up to the observer is equal to the distance Ef from the lens up to the image of the light exit point group, has been assumed.

Letting the size of the light exit point to be 2 μm, for making a projected image of 1 mm incident on the pupil of the observer, the projection magnification of the lens becomes 500 times. If the distance up to the observer is 300 mm, the focal length of the lens becomes 0.599. The light exit point is to be placed at the rear focal point position 0.6 mm. The focal length of the lens is so small that projecting at a point 300 mm from the observer is almost the same as projecting at infinity. If an interval between the nearest light exit points is 6 μm, the interval becomes 3 mm at a position of the observer. When the pupil is moved 3 mm, it is possible to see an image by a light beam of an adjacent projected image of a light exit point.

If the size of the light exit point is 5 μm, in order to make a projected image of 1.5 mm incident on the pupil of the observer, it is necessary that the projection magnification of the lens is 300 times. If the distance up to the observer is 300 mm, the focal length of the lens becomes 0.997 mm. The light exit point is placed at the rear focal point position 1.0 mm. If the interval between the nearest light exit points each other is 10 μm, the interval is 3 mm at the position of the observer. If the pupil is moved 3 mm, it is possible to see an image by a light beam of an adjacent projected image light exit point.

If the size of the light exit point is 10 μm, in order to make a projected image of 2 mm incident on the pupil of the observer. It is necessary that the projection magnification of the lens becomes 200 times. If the distance up to the observer is 300 mm, the focal length of the lens becomes 1.49 mm. The light exit point is placed at the rear focal point position 1.5 mm. If the interval between the nearest light exit points each other is 15 μm, the interval is 3 mm at the position of the observer. If the pupil is moved 3 mm, it is possible to see an image by a light beam of the adjacent a projected image light exit point.

If the size of the light exit point is 15 μm, in order to make a projected image of 1.5 mm incident on the pupil of the observer. It is necessary that the projection magnification of the lens becomes 100 times. If the distance up to the observer is 300 mm, the focal length of the lens becomes 2.97 mm. The light exit point is placed at the rear focal point position 3.0 mm. If the interval between the nearest light exit points each other is 30 μm, the interval is 3 mm at the position of the observer. If the pupil is moved 3 mm, it is possible to see an image by a light beam of the adjacent a projected image light exit point.

If the size of the light exit point is 10 μm, in order to make a projected image of 1.25 mm incident on the pupil of the observer, it is necessary that the projection magnification of the lens is 125 times. If the distance up to the observer is 250 mm, the focal length of the lens becomes 1.98 mm. The light exit point is placed at the rear focal point position 2.0 mm.

If the size of the light exit point is 20 μm, in order to make a projected image of 1 mm incident on the pupil of the observer, it is necessary that the projection magnification of the lens becomes 50 times. If the distance up to the observer is 300 mm, the focal length of the lens becomes 5.88 mm. The light exit point is placed at the rear focal point position 6.0 mm.

(Third Embodiment)

Figure 7A:
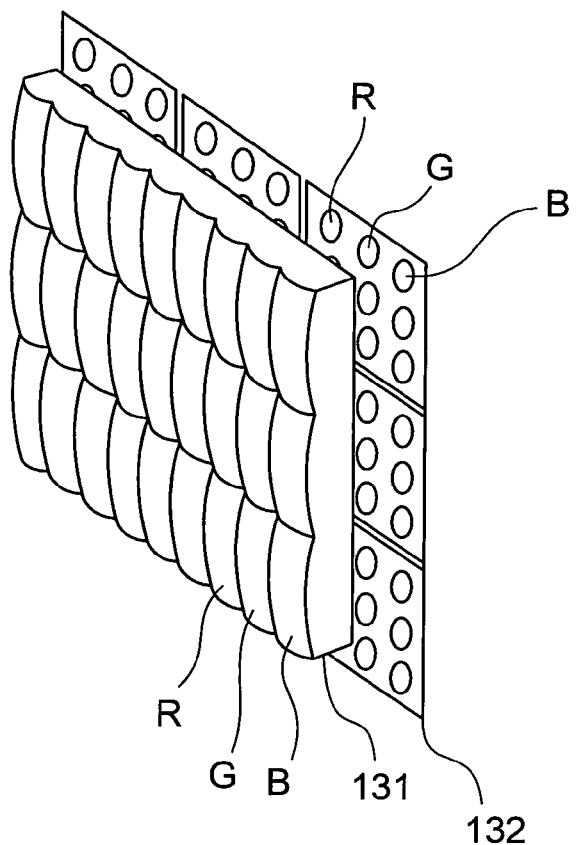
FIG. 7A is a perspective view of a micro lens array of a display apparatus according to a modified embodiment of a third embodiment of the present invention.
Figure 7B:
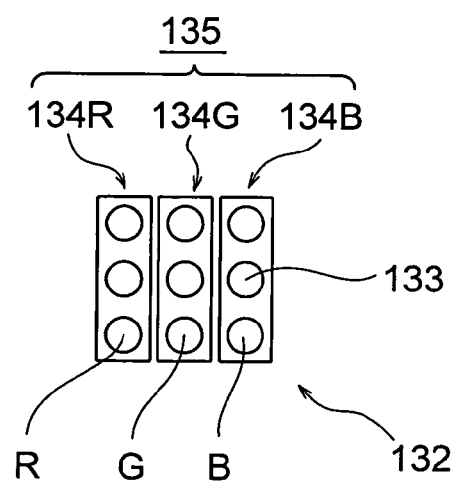
FIG. 7B is a perspective view showing a light exit point group.

In FIG. 7A and FIG. 7B, details of a structure of a display apparatus for a color display of three colors namely R (red), G (green) and B (blue) are shown. FIG. 7A is a perspective view showing a micro lens array and light exit point groups of a display apparatus according to a third embodiment.

In FIG. 7A and FIG. 7B, one light exit point group 132 corresponds to one information pixel 135. The information pixel 135 includes sub-information pixels 134R, 134G and 134B. The sub-information pixels 134R, 134G and 134B are rectangular-shaped and correspond to the colors R, G and B respectively. Such arrangement is same as an arrangement of colors in a color display of stripe type which is found commonly in a color display such as an LCD. Moreover, at least one light exit point 133 has been provided in the sub-information pixels 134R, 134G and 134B. In the third embodiment, three light exit points 133 are provided to each sub-information pixel. Moreover, an arrangement of the light exit points 133 is same in all the sub-information pixels 134R, 134G and 134B. The sub-information pixels 134R, 134G and 134B constitute a new light exit point group. It is preferable that the information pixel 135 has a square shape and the rectangular-shaped sub-information pixels 134R, 134G and 134B of RGB have a horizontal width ⅓ times of a longitudinal width.

A micro lens array 131 also includes three rectangular-shaped lenses corresponding to the sub-information pixels. Light of the same color is emerged from the plurality of light exit points 133 of the one sub-information pixel. Moreover, lights of RGB colors are emerged from the sub-information pixels 134R, 134G and 134B respectively. The light of each color emerged is incident on the pupil of the observer by the lens in the micro lens array 131. Moreover, each rectangular-shaped lens is formed as an image by the lens of the eye and an RGB image having a rectangular shape (rectangular-shaped lens image) is formed on the retina. Accordingly, the observer can see a color image.

A relationship between the interval of the light exit point groups and the interval of the lenses is similar as in the first embodiment and the second embodiment.

For instance, when an organic electro-luminescence (OEL) or an LCD of the information pixel 135 having one side of 180 μm is used, the size of the lens having a rectangular shape corresponding to the sub-information pixel is 60 μm×180 μm. If the size of the light exit point 133 in the information pixel 135 is 15 μm, in order to make a projected image of 1.5 mm incident on the pupil of the observer, it is necessary that the projection magnification of the lens is 100 times. If the distance Ff up to the observer is 300 mm, the focal length F of the lens becomes 2.97 mm. The light exit point 133 is placed at a rear focal point position Fb=3.0 mm.

$$Lpx = Ppx\, Ff/(Ff+Fb) = Ppx(Ff-F)/Ff \qquad (1\text{-}9)$$

$$Lpy = Ppy\, Ff/(Ff+Fb) = Ppy(Ff-F)/Ff \qquad (1\text{-}10)$$

From expressions (1-9) and (1-10), the size of the rectangular-shaped lens becomes 59.4 μm×178.2 μm. The diameter of a light beam of the light exit point 133 projected by the rectangular-shaped lens increases according to diffraction and becomes 2.78 mm approximately. As the increased diameter is smaller than the pupil diameter of 3 mm of a normal eye, there is an effect of increase in the depth of field.

When a display device such as an organic electro-luminescence (OEL) or a LCD having the information pixels 135 of 240×320 is used, the size of the display area thereof becomes 43.2 mm×57.6 mm. When the lenses are associated with each sub-information pixel 134R, 134G and 134B of these information pixels 135, the number of the lenses of the micro lens array 131 becomes 240×3 (RGB)×320=720×320 and then the dimension thereof is 42.8×57.03 mm. However, there is no restriction on a positional relationship of the lens and the information pixels (light exit point group 132) as described above. Consequently, the micro lens array 131 may be even larger.

For instance, when the micro lens array 131 having the same size as the display device is used, the size of the display device can be used fully effectively and therefore it is desirable. For example, when the micro lens array 131 of 43.2× 57.6 mm is to be used, the number of lenses will be 727×323. In other words, it is desirable that the effective dimension of the micro lens array 131 is more than a dimension of display of the display device having the display pixels.

For improving a color reproducibility, adding one more color to RGB may be taken into consideration.

Furthermore, other structure, action and effect of the present embodiment are common in the first embodiment.

(Fourth Embodiment)

FIG. 8A is a perspective view as seen from a lens side, showing a structure of light exit point groups and a micro lens array of a display unit according to a fourth embodiment, and FIG. 8B is a perspective view as seen from light exit point groups side, showing a structure of the light exit point groups and the micro lens array of the display unit according to the fourth embodiment. The display unit of the fourth embodiment can be composed of the arbitrary number of lenses which is not less than two and an example of 3×3 is shown here.

As shown in FIG. 8A and FIG. 8B, light exit point groups 138 are provided on a rear surface of a micro lens array 137. Each light exit point group 138 includes apertures which become light exit points and then the light exit point group 138 is an aperture group. The aperture group is formed by shielding light from one surface of the micro lens array 137 with a metallic thin film (such as chromium) and then by etching the light-shielding thin film for the apertures at a desired position. Or the aperture group can also be formed by applying a light-shielding resin including a black carbon etc. on one surface of the micro lens array 137 and by opening apertures. Methods such as a relief printing, an intaglio printing, an offset printing and a screen printing are available.

Furthermore, it is also possible to cut a hole in a light-shielding plate and attach to (install on) the micro lens array 137.

Furthermore, other structure, action and effect of the present embodiment are common in the first embodiment.

(Fifth Embodiment)

Incidentally, with recent improvement for high definition LCD, the size of one side of an information pixel becomes 90 µm. In this case, the size of a sub-information pixel becomes 30 µm×90 µm. If a lens is made smaller corresponding to the size reduction of the sub-information pixel, a problem such that a projected image of a diameter smaller than the pupil of the eye cannot be formed occurs due to spreading of a projected image of the light exit point caused by diffraction.

Figure 9:
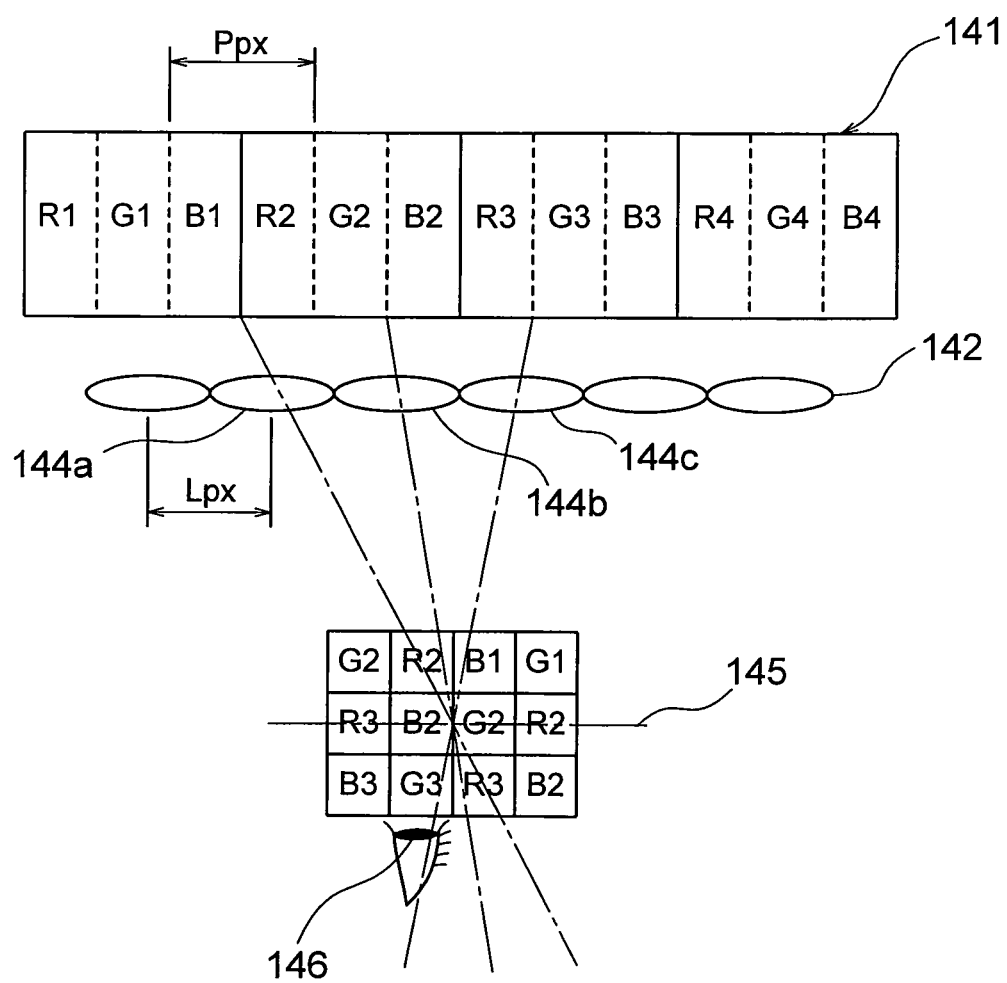
FIG. 9 is a diagram showing a structure of a display apparatus according to a fifth embodiment of the present invention.

As a solution to this problem, an example, in which an information pixel composed of two sub-information pixels is associated with one lens, is shown in FIG. 9. FIG. 9 is a diagram showing a structure of a display apparatus according to a fifth embodiment.

An information pixel 141 of a LCD or an OEL consists of sub-information pixels having a rectangular shape. Each of the sub-information pixels is assigned one of R, G and B colors and the sub-information pixels are arranged in order of R1, G1, B1, R2, G2, B2, R3, G3, B3, R4, G4 and B4. In this case, the order of RGB of the sub-information pixels is repeated, but it may be a repetition of an order other than RGB of the sub-information pixels. At least one light exit point is provided on these sub-information pixels. Moreover, the size and the shape of the lens are let to be the same as those of the information pixel combined together with the two sub-information pixels.

In the display apparatus according to the fifth embodiment, two adjacent sub-information pixels B1 and R2 constitute one information pixel, and one light exit point group is composed of one pixel. Moreover, one lens 144a is disposed at a position facing this information pixel. Similarly, sub-information pixels G2 and B2 correspond to a lens 144b, and sub-information pixels R3 and G3 correspond to a lens 144c. The correspondence other than this is as shown in FIG. 9. Practically, a larger number of sub-information pixels are arranged in a matrix two-dimensionally.

In this display apparatus, an image of a light exit point is projected in the proximity 145 of a pupil 146 of an eye by a micro lens array 142 including the lenses 144a, 144b and 144c. Projected images R3, B2, G2, R2 by the lens 144b and projected images B3, G3, R3, 32 by the lens 144c are formed corresponding to positions of projected image G2, R2, B1, G1 by the lens 144a. In other words, the projected images are formed by overlapping the images of the sub-information pixels in original arrangement shifted by two sub-information pixels.

Here, the description has been made in terms of units of sub-information pixels, but practically, the projected images are formed by overlapping the arrangement for each color shifted by two in unit of light exit point in the sub-information pixel. By overlapping the projected images of the light exit points by shifted by two, RGB are overlapped on one projected image. A light exit point group consists of two sub-information pixels, which are of different colors and overlapped in the projected image, is associated with a lens. Consequently, even if a projected image of any light exit point is incident on the pupil, light beams of R, G and B can be incident on the pupil and a color image can be seen.

Figure 10:
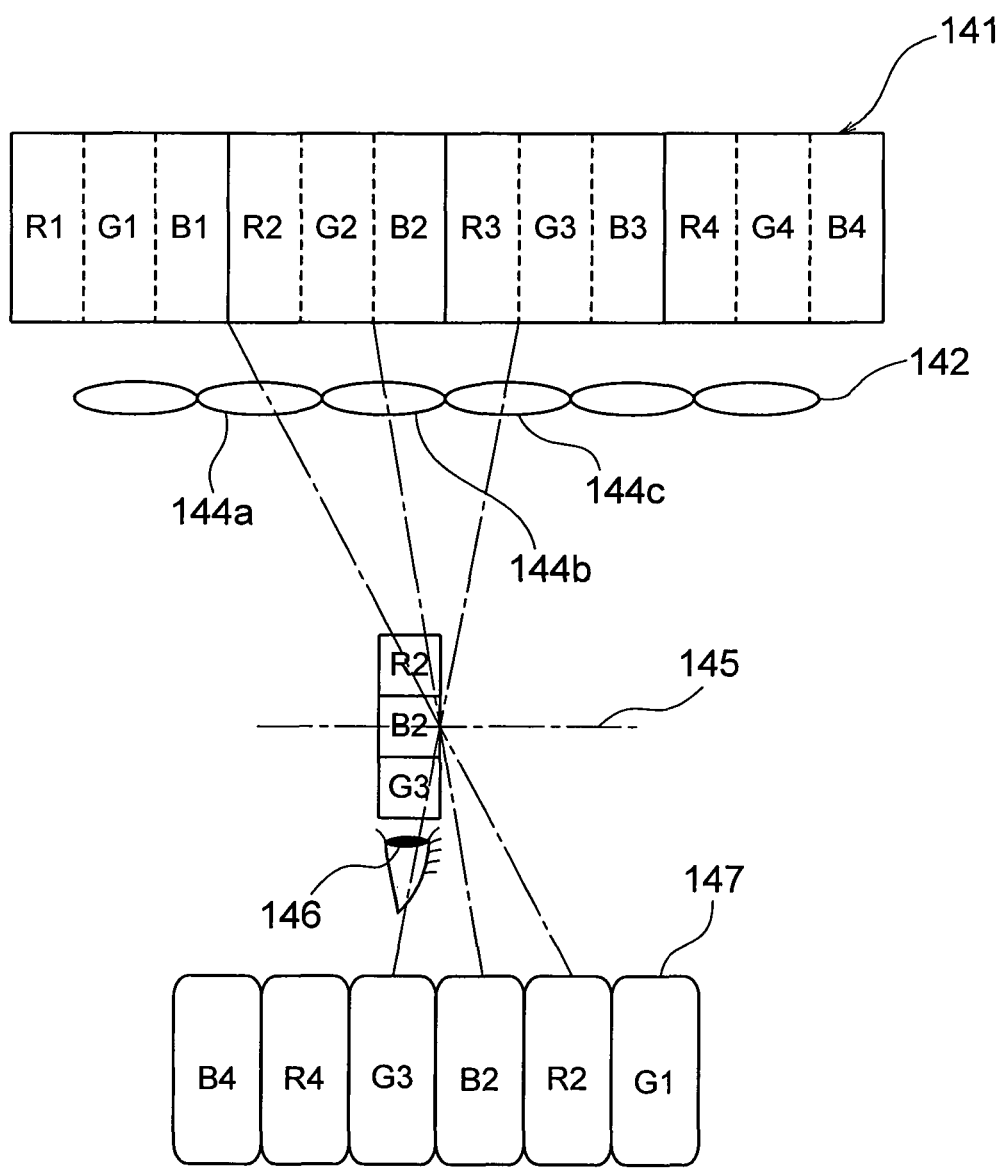
FIG. 10 is a diagram showing the display apparatus according to the fifth embodiment, and an image which is observed by the display apparatus.

For instance, when the projected images of the light exit points projected on the pupil 146 of the eye are R2, B2 and G3, an image 147 shown in FIG. 10 is observed on the retina. As mentioned above, the pixel observed on the retina is a lens. In FIG. 10, light beams from the sub-information pixels R2, B2 and G3 (more elaborately, light exit points) pass through the lenses 144a, 144b and 144c respectively. Therefore, when the lenses 144a, 144b and 144c are formed as images on the retina, images of R, G and B are formed. In other words, the observer can see a color image of RGB. For instance, when the size of the information pixel of a high-definition LCD is let to be such that one side is 90 µm, the sub-information pixel of RGB is 30 µm×90 µm. But combining the two, it becomes a combined pixel of 60 µm×90 µm. Namely, Ppx id Ppx=60 and Ppy is Ppy=90.

In the case of projecting this combined pixel on the pupil 146 300 mm ahead by a lens of F=2.97 similarly as in the abovementioned embodiments, a rectangular-shaped lens of size 59.4 µm×89.1 µm is used. Since an aperture size of the lens has become large, spreading due to diffraction is suppressed to 2.77.

Although the number of pixels which can be observed in the display apparatus according to the fifth embodiment is reduced to half, brightness is not reduced since the diameter of the lens does not decrease.

Accordingly, without changing the arrangement of the RGB of the existing FPD, it is possible to suppress spreading of a projected image of the light exit point due to diffraction and to maintain an effect of the depth of field. In other words, it is possible to use the existing FPD as an information pixel.

Furthermore, other structure, action, and effect of the present invention are similar as in the first embodiment.

(Sixth Embodiment)

Figure 11:
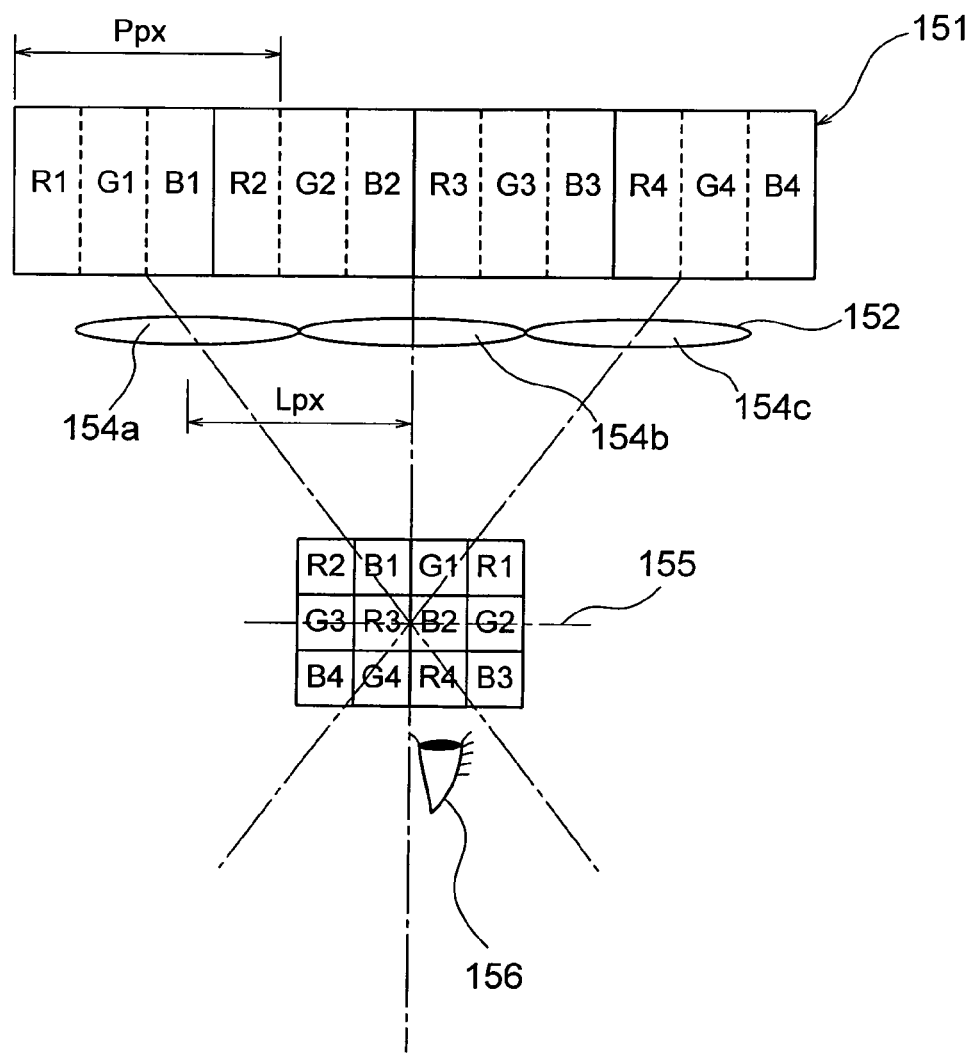
FIG. 11 is a diagram showing a structure of a display apparatus according to a sixth embodiment of the present invention.

FIG. 11 shows an example, in which an information pixel consists of four sub-information pixels and is associated with a lens. FIG. 11 is a diagram showing a structure of a display apparatus according to a sixth embodiment.

An information pixel 151 such as an LCD and an OEL is composed of sub-information pixels having a rectangular shape. R, G, and B colors are assigned to the sub-information pixels respectively, and the sub-information pixels are arranged in order of R1, G1, B1, R2, G2, B2, R3, G3, B3, R4, G4 and B4. At least one light exit point is provided on these sub-information pixels. Moreover, the size and the shape of the lens are the same size and shape of the combined four sub-information pixels which constitute the information pixel.

In the display apparatus of the sixth embodiment, four sub-information pixels R1, G1, B1, and R2 constitute one information pixel. one information pixel constitutes one light exit point group. Moreover, the lens 154a is disposed at a position facing the information pixel. Similarly, the sub-information pixels G2, B2, R3, and G3 correspond to a lens 154b, and sub-information pixels B3, R4, G4, and B4 correspond to a lens 154c. In the information pixel 151, practically, a larger number of sub-information pixels are arranged in a row two-dimensionally.

Images of the light exit points are projected in the proximity 155 of a pupil 156 of an eye by a micro lens array 152 including the lenses 154a, 154b, and 154c. Corresponding to positions of projected images R2, B1, G1, and R1 by the lens 154a, projected images G3, R3, B2, and G2 are formed by the lens 154b, and projected imaged B4, G4, R4, and B3 are formed by the lens 154c. The projected images are formed by overlapping the images of the sub-information pixels in original arrangement shifted by four sub-information pixels. Here, the description has been made in terms of units of sub-information pixels, however, practically, the projected images are formed by overlapping the arrangement for each color shifted by two in unit of light exit point. By overlapping the projected images of the light exit points shifted by four, RGB is overlapped on one projected image. A light exit point group is composed of four sub-information pixels such that the sub-information pixels of different colors are overlapped in the projected image, and the light exit point group formed is associated with one lens. Consequently, even if a projected image of any light exit point is incident on the pupil, light beam of R, G and B can be incident on the pupil and a color image can be seen.

Figure 12:
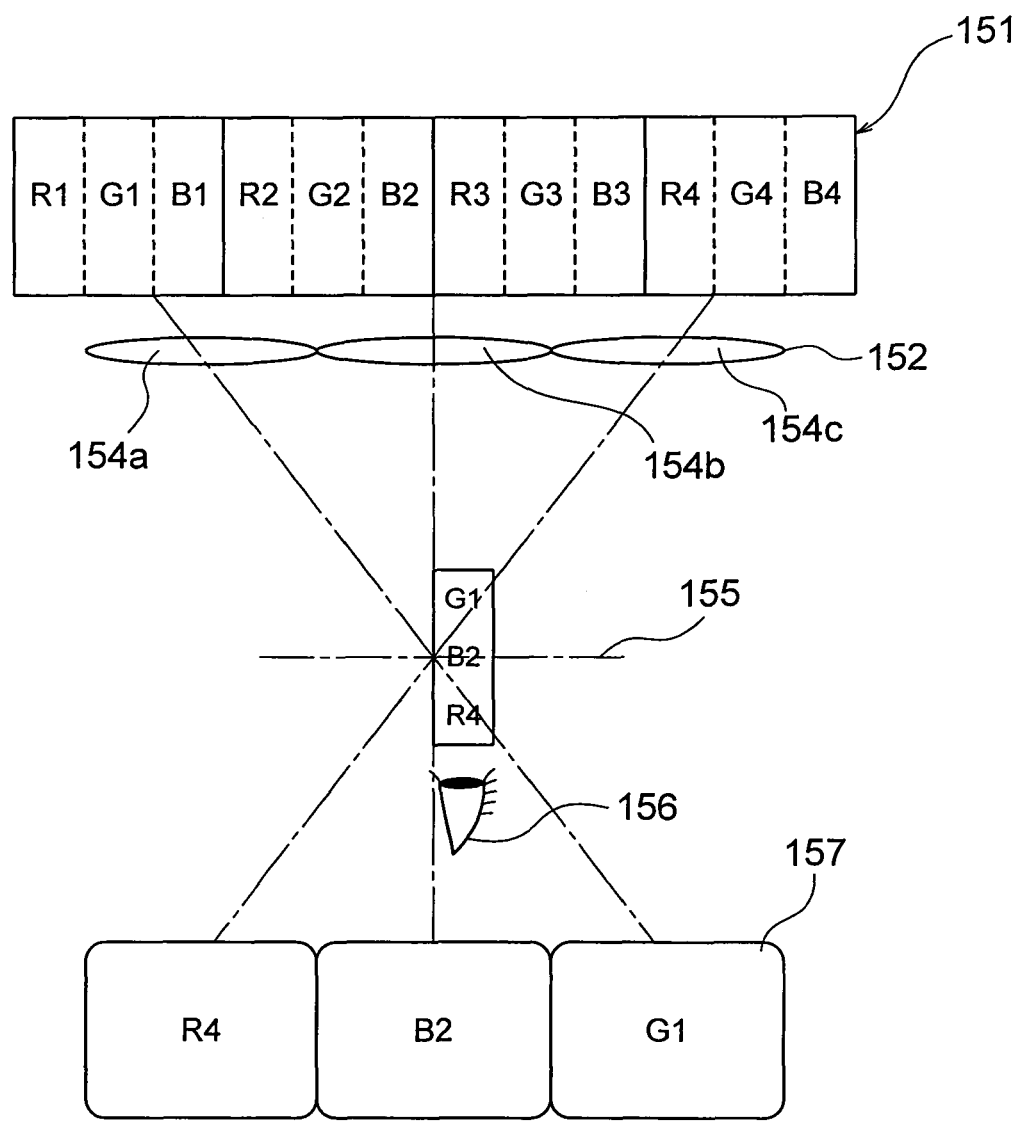
FIG. 12 is a diagram showing the display apparatus according to the sixth embodiment, and an image to be observed by this display apparatus.

For instance, if the projected images of the light exit points which on the pupil 156 of the eye are G1, B2, and R4, an image 157 shown in FIG. 12 is observed on the retina. FIG. 12 is a diagram showing a display apparatus according to the sixth embodiment, and an image observed by the display apparatus.

As it has been mentioned above, the pixel which is observed on the retina is an image of a lens. In FIG. 12, light beams from the sub-information pixels G1, B2, and R4 (more elaborately, light exit points) pass through the lenses 154a, 154b, and 154c respectively. Therefore, when the lenses 154a, 154b, and 154c are formed as images on the retina, images of R, G, and B are formed. In other words, the observer can see a color image of RGB. For instance, when the size of the information pixel of a high-definition LCD is such that one side thereof is 90 µm, the sub-information pixel of RGB is 30 µm×90 µm, but combining the four, it becomes a combined pixel of 120 µm×90 µm. In other words, Ppx becomes Ppx=120, and Ppy becomes Ppy=90. In the case of projecting this on the pupil 156 300 mm ahead by a lens of F=2.97 similarly as in the above-mentioned embodiments, a lens corresponding to this is a rectangular-shaped lens of size 118.8 µm×89.1 µm. Since an aperture diameter of the lens has become large, spreading due to diffraction is suppressed to 1.4 mm.

The number of pixels for which the observer can observe is reduced to one fourth. However, since the diameter of the lens does not decrease, brightness is not reduced.

(Seventh Embodiment)

Figure 13:
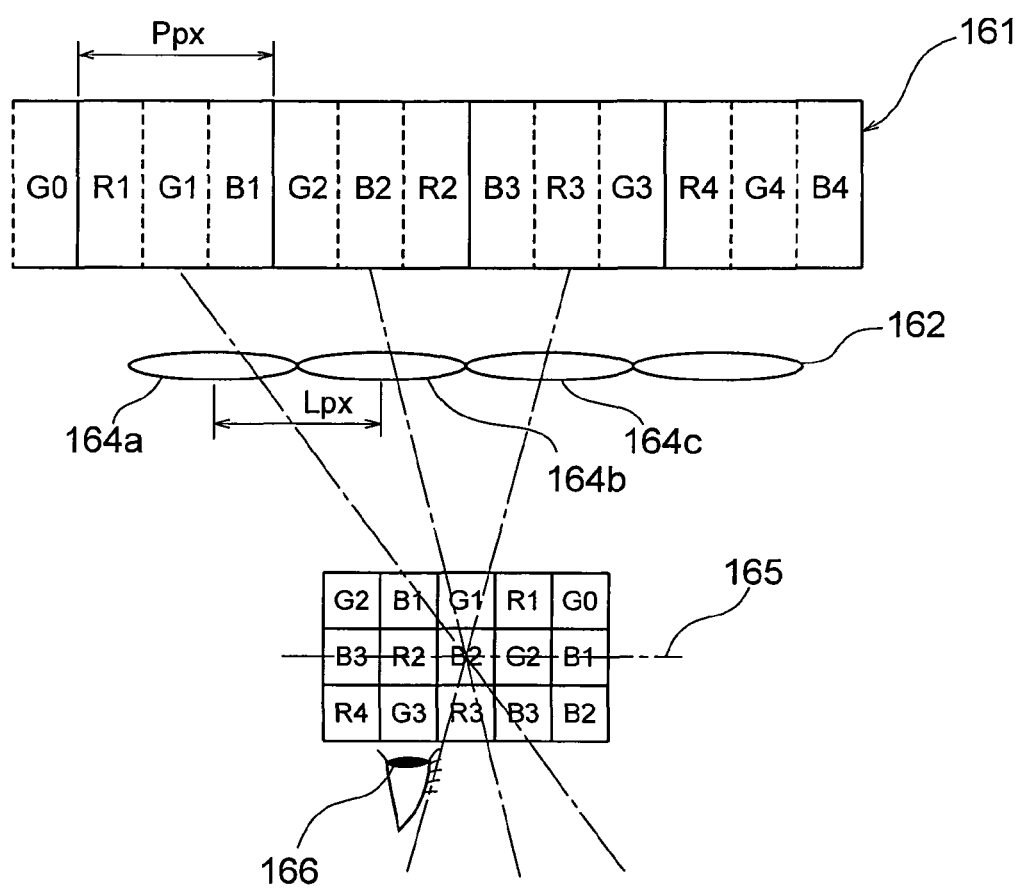
FIG. 13 is a diagram showing a structure of a display apparatus according to a seventh embodiment of the present invention.
Figure 14:
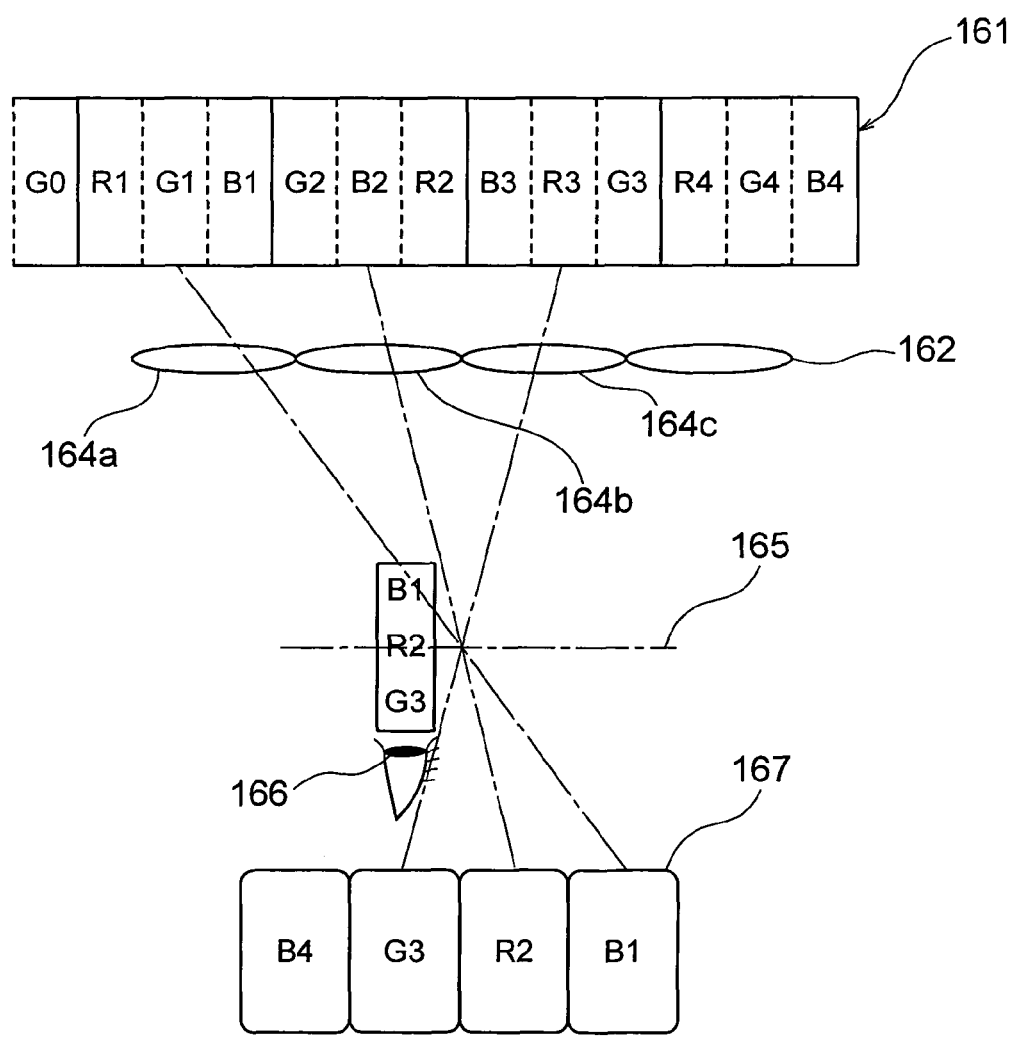
FIG. 14 is a diagram showing the display apparatus according to the seventh embodiment, and an image to be observed by this display apparatus.

FIG. 13 shows an example, in which an information pixel consists of three sub-information pixels and is associated with a lens. Namely, the lens is associated with a normal information pixel which includes sub-information pixels of R, G, and B. However, the arrangement of R, G, and B in the information pixel is changed. Here, FIG. 13 is a diagram showing a structure of a display apparatus according to a seventh embodiment. FIG. 14 is a diagram showing the display apparatus of the seventh embodiment and an image observed by this display apparatus.

An information pixel 161 such as an LCD or an OEL consists of sub-information pixels having a rectangular shape. R, G, and B colors are assigned to the sub-information pixels respectively, and the sub-information pixels are arranged in order of G0, R1, G1, B1, G2, B2, R2, B3, R3, G3, R4, G4, and B4. In this manner, in the seventh embodiment, the arrangement (alignment) of the sub-information pixels is not a repetition of the order of RGB. Therefore, when one information pixel is composed of three sub-information pixels, as compared to the two adjacent information pixels, the arrangement of colors of the sub-information pixels differs. Moreover, at least one light exit point is provided on these sub-information pixels. Moreover, the size and the shape of the lens are the same size and shape of the combined three sub-information pixels which constitute the information pixel.

In the display apparatus of the seventh embodiment, three sub-information pixels R1, G1, and B1 constitute one information pixel, and one light exit point group consists of the information pixel. Moreover, one lens 164a is disposed at a position facing the information pixel. Similarly, the sub-information pixels G2, B2, and R2 correspond to a lens 164a, and sub-information pixels B3, R3, and G3 correspond to a lens 164c. Practically, a larger number of sub-information pixels are arranged in a row two-dimensionally.

Images of the light exit points are projected in the proximity 165 of a pupil 166 of an eye by a micro lens array 162 including the lenses 164a, 164b, and 164c. Corresponding to positions of projected images G0, R1, G1, B1, and G2 by the lens 164a, projected images B1, G2, B2, R2, and B3 are formed by the lens 164b, and projected images R2, B3, R3, G3, and R4 are formed by the lens 164c. In other words, the projected images are formed by overlapping the images of the sub-information pixels in original arrangement shifted by three sub-information pixels. Here, the description has been made in terms of units of sub-information pixels, but practically, the projected images are formed by overlapping the arrangement for each color shifted by three in unit of light exit point. R, G and B are overlapped in one projected image by overlapping the projected images of the light exit points shifted by three.

When the sub-information pixels in the information pixel have the same repetition of RGB, the same color is overlapped and projected. Therefore, in the seventh embodiment, the repetition of RGB of the sub-information pixels in the information pixel is in different order for each information pixel. In the seventh embodiment, light exit point group consists of three sub-information pixels, which are of different colors and overlapped in the projected image, is associated with a lens. Moreover, by overlapping the projected images of the light exit points shifted by every three projected images, it is possible to overlap images of R, G, and B in one projected image. Therefore, even when the projected image of any light exit point is made to be incident on the pupil, light beams of RGB can be incident on the pupil and a color image can be seen.

For instance, if the projected images of the light exit points projected on the pupil 166 of the eye are B1, R2, and G3, an image 167 shown in FIG. 14 is observed on the retina. As it has been mentioned above, the pixel observed on the retina is an image of a lens. In FIG. 13, light beams from the sub-information pixels B1, R2, and G3 (more elaborately, light exit points) pass through the lenses 164a, 164b, and 164c respectively. Therefore, when the lenses 164a, 164b, and 164c are formed as images on the retina, images of R, G, and B are formed. Namely, the observer can see a color image of RGB.

For instance, the size of one side of the information pixel of a high-definition LCD is 90 µm. In this case, the sub-information pixel is 30 µm×90 µm. However, combining the three sub-information pixels, it becomes a combined pixel of 90 µm×90 µm which is the same as the information pixel. In the case of projecting this information pixel on the pupil 166 300 mm from the observer by a lens of F number=2.97 similarly as in the abovementioned embodiments, a lens corresponding to this situation is a rectangular-shaped lens of size 89.1 µm×89.1 µm. Since an aperture diameter of the lens has become large, spreading due to diffraction is suppressed to be 1.8 mm.

The number of pixels for which observer can observe is reduced to one third. Since the diameter of the lens does not decrease, brightness is not reduced.

Furthermore, other structure, action, and effect are common in the first embodiment.

(Eighth Embodiment)

Figure 15A:
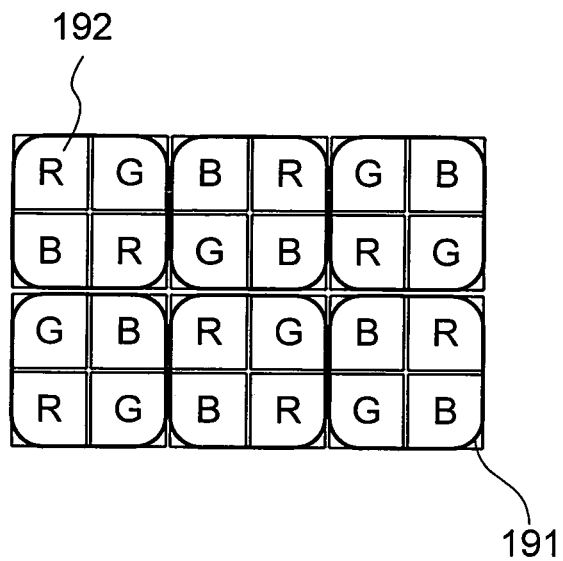
FIG. 15A and FIG. 15B are diagrams showing an example of an arrangement of sub-information pixels for a color display apparatus according to an eighth embodiment of the present invention.
Figure 15B:
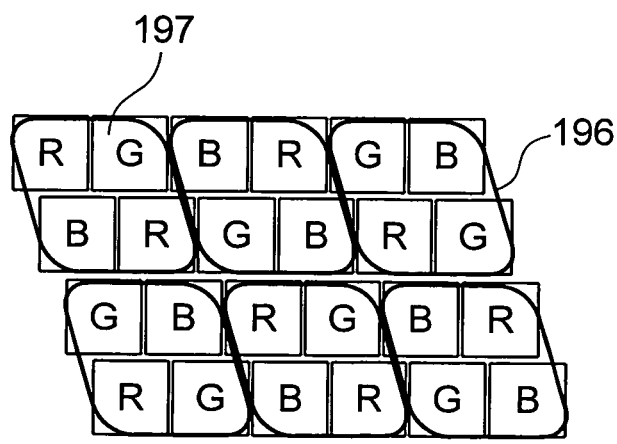

FIG. 15A and FIG. 15B are diagrams showing an example of an arrangement of sub-information pixels for a color display according to an eighth embodiment.

In a pixel arrangement of color display, a diagonal arrangement (FIG. 15A) and a delta arrangement (FIG. 15B) are available apart from the abovementioned rectangular-shaped (stripe) arrangement. In these cases as well, four sub-information pixels 192 and 197 are combined to constitute one information pixel 191 and 196 (light exit point), and it is possible to associate one information pixel with one lens. Consequently, by associating four pixels 192 and 197 (sub-information pixels) with one pixel lens, it is possible to overlap RGB on the pupil of the observer. Since an aperture diameter of lens has increased, spreading due to diffraction is suppressed.

Furthermore, other structure, action, and effect of the present invention are common in the first embodiment.

(Basic Structure of Ninth Embodiment)

Figure 16:
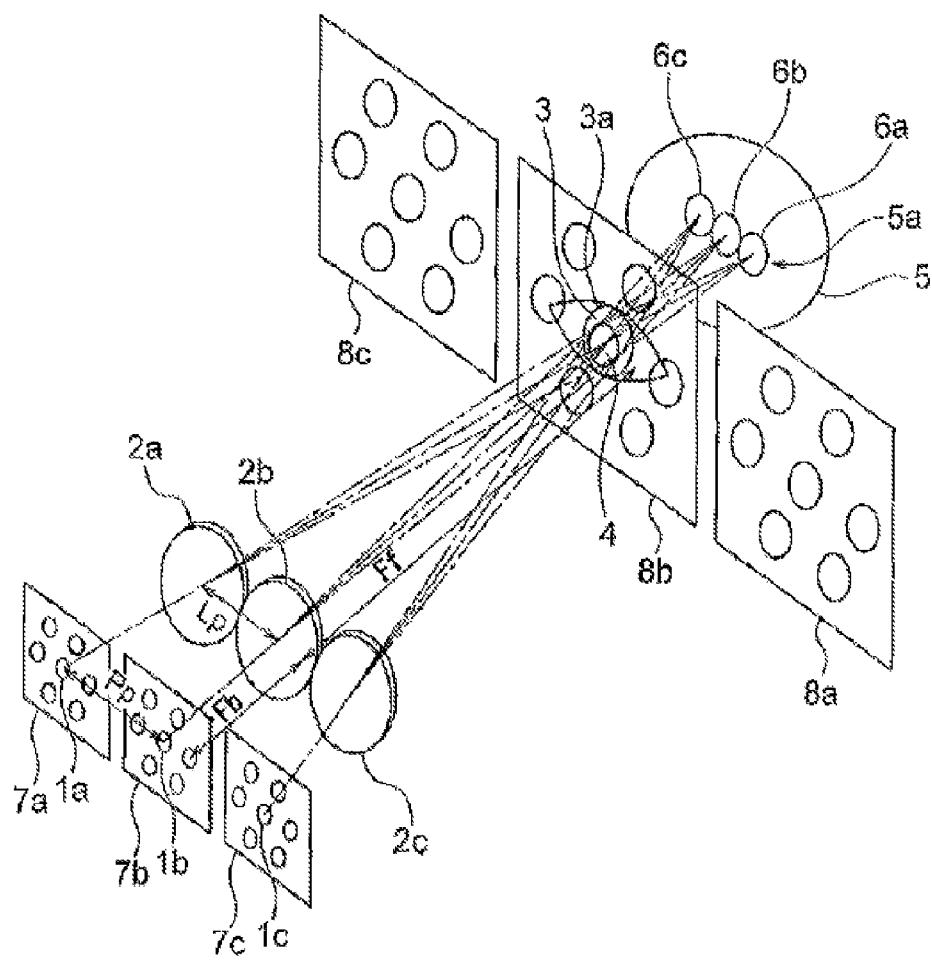
FIG. 16 is a perspective view showing a structure of a display apparatus according to a ninth embodiment of the present invention.

FIG. 16 is a perspective view showing a structure of a display apparatus according to a ninth embodiment of the present invention. A concept behind the display principle according to the ninth embodiment will be described below by referring to FIG. 16. In FIG. 16, a lens 3 is a lens of an eye of a person who observes the display (an observer of the display). A pupil 3a is a pupil of an eye 3. In this case, the pupil 3a means an aperture of the lens 3 of the eye.

Lights emerged from apertures 1a, 1b, and 1c are projected by lenses 2a, 2b, and 2c such that respective images thereof to be overlapped on the pupil 3a. For this purpose, an interval of the lenses 2a, 2b, and 2c is set to be such that the lights emerged from the apertures 1a, 1b, and 1c overlap at a position of the pupil 3a.

In other words, a relationship shown by the following expression holds true.

$$Lp/Pp=(Ff-F)/Ff$$

where,

Lp is the interval of the lenses 2a, 2b, and 2c,

Pp is the interval of the apertures 1a, 1b, and 1c,

Ff is the distance from the lens 2b up to the image 8b of a light exit point group, and F is the focal length of the lens 2b.

A size 4 of the images of the apertures 1a, 1b, and 1c which are projected on the pupil 3a is set smaller than a diameter of the pupil 3a. In other words, a light beam (size 4) which passes through the pupil 3a is smaller than the pupil 3a. Moreover, the lenses 2a, 2b, and 2c are projected on a retina by the lens 3 of the eye, and images 6a, 6b, and 6c of lenses are formed. When the lenses 2a, 2b, and 2c are considered as pixels, the images 6a, 6b, and 6c of the lenses become images of pixels. When light of a signal of the picture image (i.e. video signal) is provided on the apertures 1a, 1b, and 1c, it is possible to see an image.

Here, in the case of an eye of a farsighted person due to old age, focusing is not on the retina 5. However, since the light beam (size 4) smaller than the pupil 3a is used for image formation of the lenses 2a, 2b, and 2c which are pixels, an image having a deep namely, large focal depth is formed. Therefore, the observer can see a focused image easily. This will be described later by using FIG. 3.

A plurality of apertures may be provided corresponding to each of the lenses 2a, 2b, and 2c which are pixels. In other words, an arrangement may be such that aperture groups 7a, 7b, and 7c are provided corresponding to the lenses 2a, 2b, and 2c respectively.

The aperture groups 7a, 7b, and 7c are projected by the lens 2b, and form aperture images 8a, 8b, and 8c. Here, the aperture images 8b and 8c of the aperture groups 7a and 7b are formed by the lens 2a, and the aperture images 8a and 8b of the aperture groups 7b and 7c are formed by the lens 2c.

In FIG. 16, a drawing has been made such that a gap in the form of a straight line is provided between two adjacent aperture groups. This gap is drawn for making the description clearer. Therefore, practically there is no unnecessary gap between the aperture groups. Regarding the description of the gap between the aperture groups are common in following diagrams.

Figure 17:
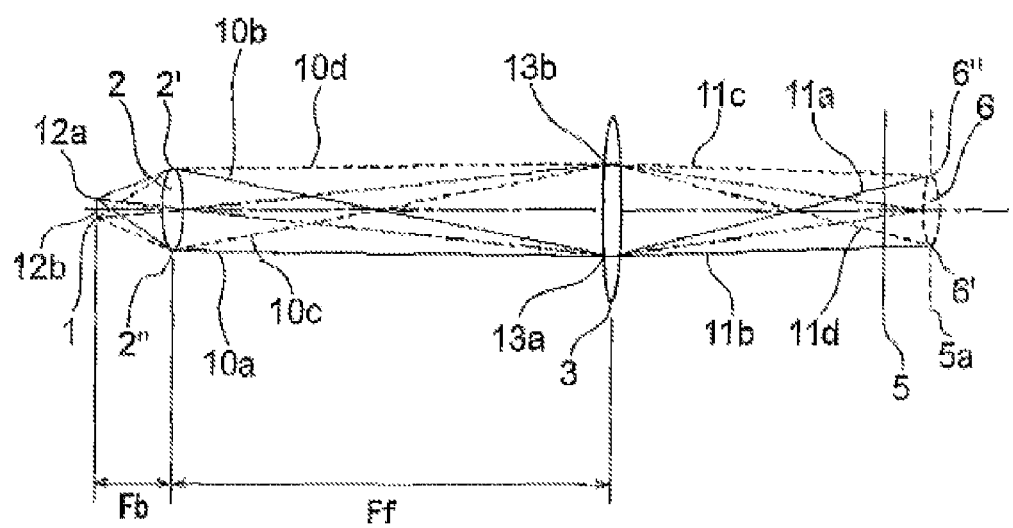
FIG. 17 is a diagram showing the optical system of the display apparatus according to the ninth embodiment.

FIG. 17 is a diagram showing an optical system of the display apparatus of the basic structure. Image formation of the aperture 1 and the lens 2 will be described below by using FIG. 17.

The aperture 1 is projected on the lens 3 of the eye by the lens 2. Concretely, light emerged from a point 12a on the aperture 1, after passing through the lens 2, becomes light rays 10a and 10b shown by solid lines. Moreover, an image 13a of the point 12a is formed on the lens 3 of the eye by the light rays 10a and 10b.

The light emerged from the point 12b on the aperture, after passing through the lens 2, becomes light rays 10c and 10d shown by dashed lines. Moreover, an image 13b of the point 12b is formed on the lens 3 of the eye by the light rays 10c and 10d.

An image of the lens 2 is formed in the proximity 5a of the retina 5 by the lens 3 of the eye. Concretely, a point 2' of the lens 2 is formed as an image on a point 6' as shown by light rays 10b, 11b, 10d, and 11d. Moreover, a point 2" of the lens 2 is formed as an image on a point 6" as shown by light rays 10a, 11a, 10c, and 11c. In this manner, in the proximity 5a of the retina 5, an image 6 of the lens 2 is formed.

Next, characteristics of an image of the aperture group will be described below. A focal length of the lens 2 is short, and a focal depth of the image of the aperture group formed on the pupil 3a of the eye of the observer is deep. When the focal length is short with the same image forming distance, magnification becomes high. As the magnification becomes high, NA of an image side becomes extremely small. Therefore, the focal depth becomes deep. Accordingly, a demand for an accurate focusing on the pupil is low.

In other words, when the focal length of the lens 2 is short, it is the case equivalent to projecting the pupil at infinity. Consequently, the aperture group is at infinity as seen by the observer, and the observer could see a focused image even when a diameter of a light beam entering the pupil is not smaller than the diameter of the pupil.

It is preferable that the aperture in this case is circular shaped as described above. However, it may not be necessarily round shape.

Figure 18:
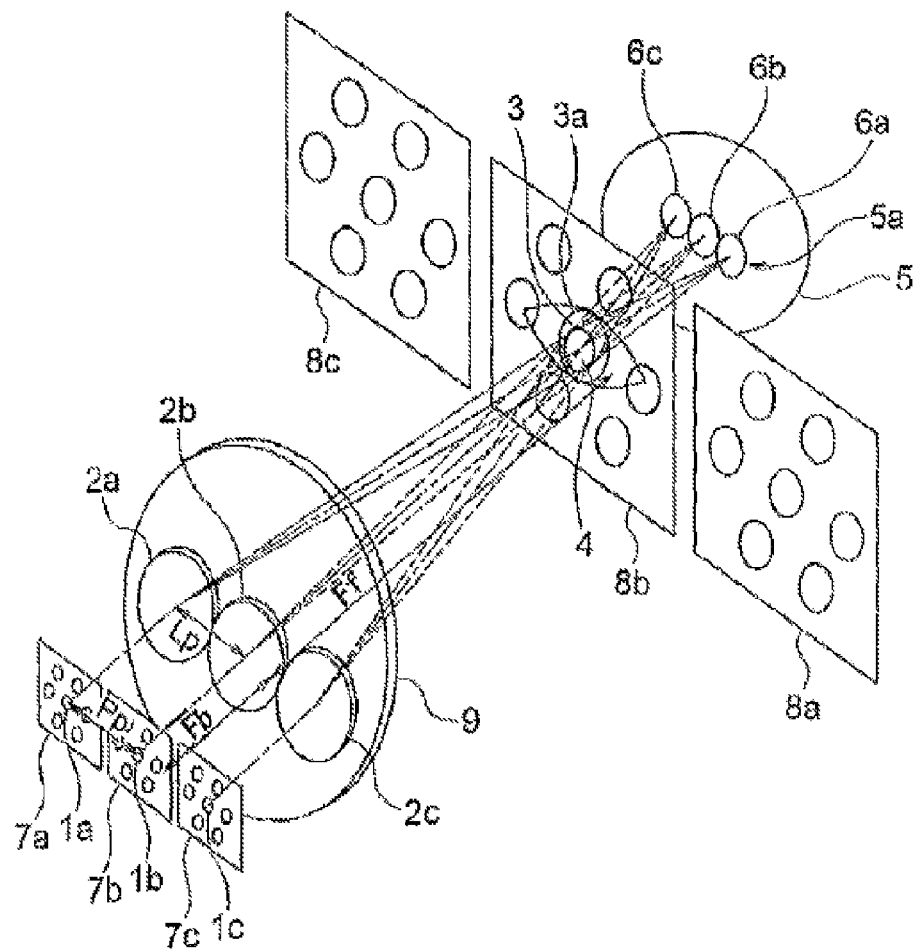
FIG. 18 is a diagram showing another structure of the ninth embodiment.

FIG. 18 is a diagram showing another basic structure. The apertures 1a, 1b, and 1c are disposed at the same interval as the lenses 2a, 2b, and 2c which are pixels. In other words, the structure is such that the interval Pp and the interval Lp are same. Lights emerged from the apertures 1a, 1b, and 1c are projected on the pupil of the lens 3 of the eye of the observer displayed by the lenses 2a, 2b, and 2c. Here, as shown in FIG. 16, when there is nothing between lenses 2a, 2b, and 2c and the lens 3 of the eye, images of the apertures do not overlap.

Consequently, a field lens 9 is disposed on an image side of the lenses 2a, 2b, and 2c. Accordingly, respective images of the apertures 2a, 2b, and 2c are formed to overlap on the pupil of the lens 3 of the eye. In this manner, in the case of making the interval Pp of the apertures 1a, 1b, and 1c and the interval Lp of the lenses 2a, 2b, and 2c to be the same, it is necessary to use the field lens 9.

A structure may be such that a plurality of apertures is provided corresponding to each of the lenses 2a, 2b, and 2c which are pixels. In other words, the aperture groups 7a, 7b, and 7c are formed corresponding to the lenses 2a, 2b, and 2c respectively.

The aperture groups 7a, 7b, and 7c are projected by the lens 2b, and form aperture images 8a, 8b, and 8c. Here, the aperture images 8b and 8c of the aperture groups 7a and 7b are formed by the lens 2a. The aperture images 8a and 8b of the aperture groups 7b and 7c are formed by the lens 2c.

Next, optical characteristics which are same as in the embodiments described by referring to FIG. 16 and FIG. 18 will be described below.

At the time of projecting the aperture, an image of at least one aperture is projected on the pupil. For increasing the depth of field, it is desirable that the diameter of a light beam incident on the pupil of the observer's eye, or in other words, a size of the projected image projected by the lens of the aperture is smaller than the diameter of the pupil.

The pupil diameter is about 3 mm, when the brightness is normal. Therefore, for increasing the depth of field, it is preferable that the size of the diameter of the light beam, or in other words, a diameter of the image of the aperture is 2.8 mm or smaller.

Whereas, when the diameter of the light becomes small, a resolving power of the eye is degraded.

An angular resolving power θ of an eye can be expressed by the following expression (2-1).

$$\theta = \lambda/\Phi \qquad (2\text{-}1)$$

where,
λ denotes a wavelength, and
Φ denotes a diameter of the light beam.

Consequently, when the wavelength is let to be 0.55 μm, the resolving power (a diffraction limit) of the diameter 2 mm of a light beam corresponds to an eyesight of approximately 1.0. When the light beam is narrowed to 1 mm, the eyesight is degraded to 0.5. However, since there is a resolving power of 0.17 mm 300 mm ahead, generally there is no problem.

When the diameter of the light beam is narrowed down to 0.5 mm, the eyesight is degraded down to equivalent of 0.25. The resolving power at a point 300 mm from the observer is degraded down to about 0.33 mm. With such resolving power, it is possible to identify somehow characters of size of about 3 mm.

Furthermore, when the diameter of the light beam is narrowed further down to 0.2 mm, the eyesight is degraded to equivalent of 0.1. The resolving power at a point 300 mm from the observer is degraded down to about 0.9 mm. Consequently, the diameter of the light beam 0.5 can be narrowed down to about 0.5 at the least.

Sometimes, a boundary of an intensity distribution of a projected image of an aperture is not clear due to factors such as diffraction. In such case when the boundary of the projected image is not clear, the size of the projected image can be considered to be full width at half maximum equivalently.

A distance at which a farsighted person due to old age has a difficulty in seeing an object is a short distance in many cases. Therefore, in order that it is easy to see an object at the distance of about 300 mm, it is preferable to project an image of the aperture at 300 mm from the observer assuming the distance to the observer is 300 mm. Moreover, further shorter distance may be taken into consideration according to an application.

For achieving the effect of increase in the depth of field, it is preferable that a size of the projected aperture is about 2.8 mm or less than 2.8 mm. Moreover, since the size of each lens corresponds to the size of the pixel, a size of 500 μm or less is preferable for carrying out a high-definition display.

Furthermore, the resolving power is approximately 0.1 mm when a person having the eyesight of 1.0 sees an object positioned at 300 mm from the observer. At this time, it is preferable that the size of the lens is half of that, which is 0.05 mm, in other words 50 μm. This size of the lens is a diameter of the lens or a length of one side of the lens.

On the other hand, it is necessary to take into consideration spreading of a light beam due to diffraction. A flare angle φ due to diffraction is expressed by the following expression (2-2).

$$\phi = \lambda/D \qquad (2\text{-}2)$$

where,
λ denotes a wavelength, and
D denotes the size of the aperture (diameter or length of one side).

Consequently, when observed at a distance Z, the size φ of the light beam is expressed by the following expression (2-3).

$$\phi = \lambda Z/D \qquad (2\text{-}3)$$

where,
λ denotes a wavelength,
Z denotes an observation distance, and
D denotes a size of the aperture (diameter or length of one side).

When D=50 μm, φ becomes 3.3 mm. It is revealed that the effect of narrowing the pupil equivalently by the light beam almost ceases. Consequently, it is preferable that the size of the lens is 50 μm or more. Moreover, the size of the lens for maintaining the size of the light beam to 1 mm on the pupil at a distance of observation 300 mm is 165 µm. Accordingly, it is desirable that the size of the lens is in the range of 50 µm to 500 µm.

Figure 19A:
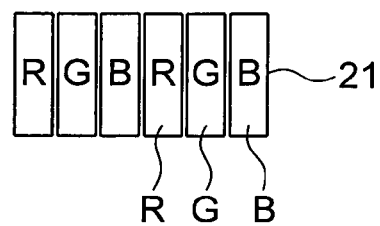
FIG. 19A and FIG. 19B are diagrams explaining an example in which the display principle of the present invention is applied to a display device.
Figure 19B:
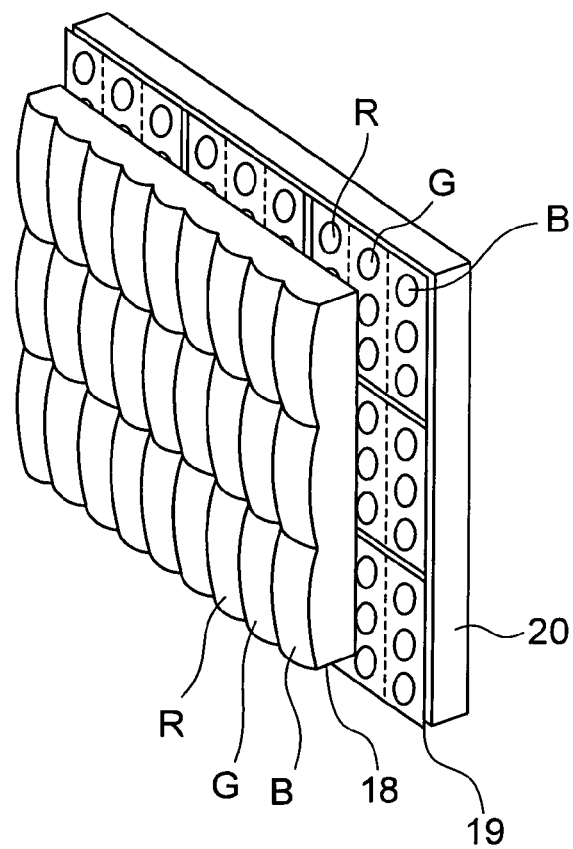
Figure 20:
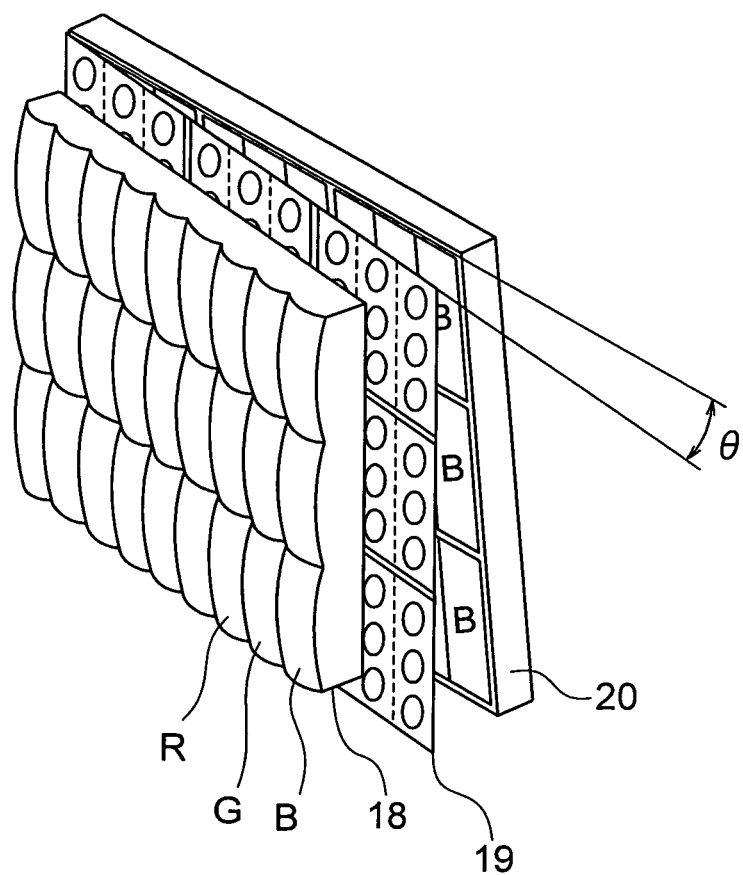
FIG. 20 is another diagram explaining the example in which the display principle of the present invention is applied to the display device.

Next, by referring to FIG. 19A, FIG. 19B, and FIG. 20, issues which arise when the display principle explained by FIG. 16 and FIG. 18 is applied to an actual display device such as a LCD (liquid crystal display and liquid crystal device) and an OEL (organic electro-luminescence display or organic electro-luminescence device) will be described below.

A pixel of a flat panel display (FPD) such as a LCD and OEL is called "information pixel" to tell apart the pixel of a FPD from a pixel which is the lens in this invention. As shown in FIG. 19B, a display unit includes a micro lens array 18 and an aperture group 19 which includes apertures.

The lens of the micro lens array 18 has an operation and an effect of the lenses 2a, 2b, and 2c described in FIG. 16, and similarly, the apertures in the aperture group 19 have an operation and an effect of the apertures 1a, 1b, and 1c in FIG. 16.

The display unit is to be used by mounting on a display device 20. An information pixel 21 of the display device 20 is composed of a stripe of R (red), G (green), and B (blue) as shown in FIG. 19A.

FIG. 19B is the case of the basic structure shown in FIG. 16, and the size of the micro lens array 18 is smaller than that of the display device 20 and the aperture group 19.

The aperture group 19 is illuminated by the information pixel 21 of the display device 20, and becomes a stripe pattern of R, G, and B similarly as a stripe structure of the information pixel. The lenses of the micro lens array 18 also have a stripe (rectangular) shape corresponding to the aperture group 19 of R, G, and B.

With the recent advancement of LCD, there has been an improvement for high-definition, and a size of an information pixel has become about 0.09 mm×0.09 mm. A size of a sub-information pixel of each of R, G, and B colors has become smaller down to 30 µm×90 µm. With the decrease in the size, a size of a lens corresponding to the decreased size becomes 30 µm×90 µm or smaller.

The reason for the size of the lens becoming the abovementioned size is that Pp becomes Pp=Lp when the field lens effect is used. Moreover, when the field lens effect is not used, this is because the relationship between the Pp and Lp is Lp/Pp=(Ff−F)/Ff and the interval of the lens Lp and Pp are related by Lp<Pp.

When the size of the lens is 30 µm, according to expression (2-3), diffraction spreading reaches up to even 5.5 mm. Therefore, an aperture cannot be projected to be smaller than the pupil diameter.

Moreover, even in the case of a larger information pixel of a size 0.18 mm×0.18 mm for example, for associating a sub-information pixel with the aperture group 19, it is necessary to adjust a tilt of the display unit and the information pixel 21 to 0.18 mm or less which is the size of the information pixel over an area of display of the display device 20.

In other words, as shown in FIG. 20, it is necessary to contain the tilt θ between the display device 20 (the information pixel 21) and the aperture group 19 within the size of one information pixel over an area of display of the display device 20. Therefore, when the size of the information pixel is small, it is necessary to position between the display device 20 and the aperture group 19 highly accurately, that is, to carry out the adjustment of the tilt. The tilt between the display device 20 and the aperture group 19 also includes a state where the display device 20 and the aperture group 19 are in contact, one of the display device 20 and the aperture group 19 is rotated a normal line of a plane as an axis. Similarly, it is necessary to contain the tilt between the micro lens array 18 and the aperture group 19 within the size of one information pixel, or, within the size of the lens.

(Ninth Embodiment)

Figure 21A:
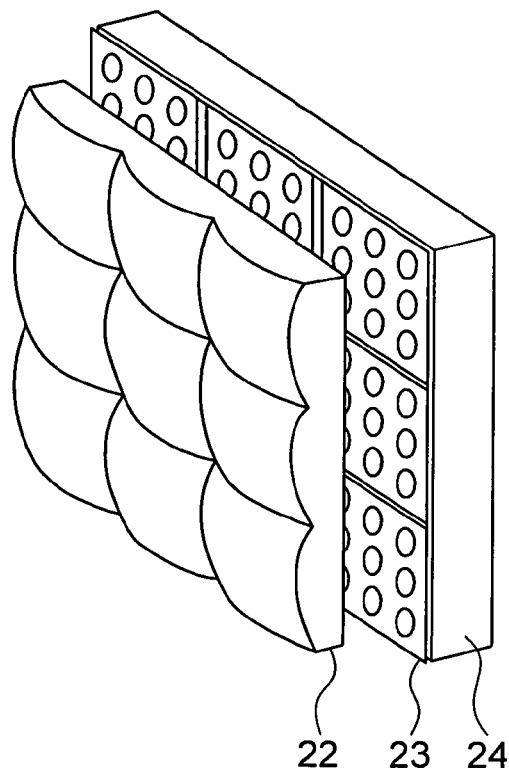
FIG. 21A is a perspective view showing a structure of a display unit according to a second embodiment of the present invention.

FIG. 21A is a perspective view showing a structure of a display unit according to a ninth embodiment of the present invention. Although a large number of normal lenses have been provided, for simplifying the description, 3×3 lenses out of the large number of lenses have been shown.

The display unit includes a micro lens array 22, an aperture group 23, and a spacer 24. Light from a sub-information pixel of R, G, and B of an information pixel 21 of an LCD is spread through the spacer 24, and reaches an aperture of (in) the aperture group 23.

FIG. 21A is a case of the basic structure shown in FIG. 16, and the micro lens array 22 is smaller as compared to the size of the aperture group 23 and the spacer 24.

Consequently, lights of R, G, and B are incident on one aperture. Therefore, the size of the lens in the micro lens array may be larger than the information pixel. In other words, in the ninth embodiment, since it is possible to increase the size of the lens, it is possible to suppress the diffraction spreading. As a result, it is possible to project the aperture to be smaller than the pupil diameter. Moreover, since the positioning of the display device 20 (the information pixel 21) and the aperture group 19 is to be carried out with the spacer 24 as a reference, no high accuracy is required in the positioning of the display device 20 and the aperture group 19 (the positioning can be carried out easily).

(First Modified Embodiment of Ninth Embodiment)

Figure 21B:
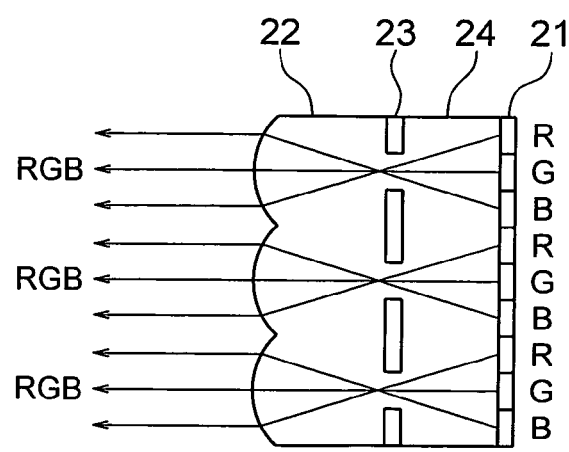
FIG. 21B shows a cross-sectional structure of a modified embodiment of the second embodiment.
Figure 22:
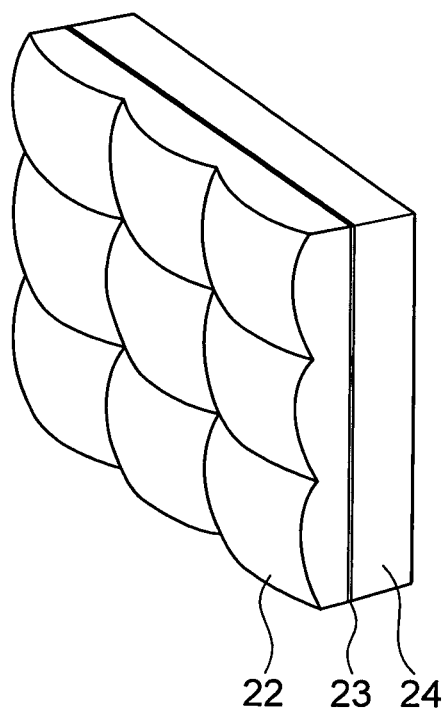
FIG. 22 is a diagram explaining a structure in which a micro lens array and an aperture group are joined tightly.

FIG. 21B shows a cross-sectional structure of a first modified embodiment of the ninth embodiment. The structure is a case of the basic structure shown in FIG. 18, with the size of the aperture group 23 and the spacer 24 same as the size of the micro lens array 22. In this structure, the above-mentioned field lens is used.

Moreover, in FIG. 21A, a space is provided between the micro lens array 22 and the aperture group 23. However, it is not limited to such structure, the structure may be such that the space is removed and the micro lens array 22 and the aperture group 23 are contacted closely.

In this manner, the first modified embodiment of the ninth embodiment is particularly effective for a display device in which the size of the information pixel (interval of the information pixels) is 0.3 mm or less. Moreover, this embodiment is particularly effective when the size of the sub-information pixel (interval of the sub-information pixels) of R, G, and B is 0.1 mm or less.

For forming the aperture, first of all, a metallic thin film of a material such as chromium is formed on a flat surface side of the micro lens array 22 and the spacer 24. Next, the aperture is formed by etching the metallic thin film.

As another procedure for forming the aperture, a light-shielding resin including a material such as black carbon may be applied on the flat surface side of the micro lens array 22 and the spacer 24, and then the aperture may be formed. As a method for applying the light-shielding resin, printing methods such as the relief printing, the intaglio printing, the offset printing, and the screen printing can be used.

(Second Modified Embodiment of Ninth Embodiment)

Figure 23A:
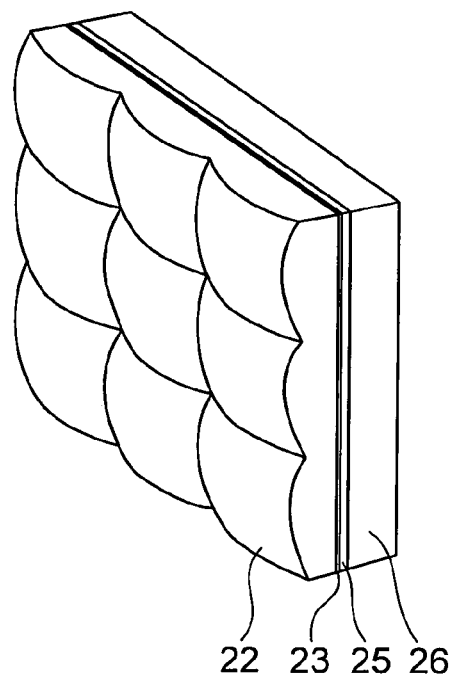
FIG. 23A is a perspective view when a diffuser is used.
Figure 23B:
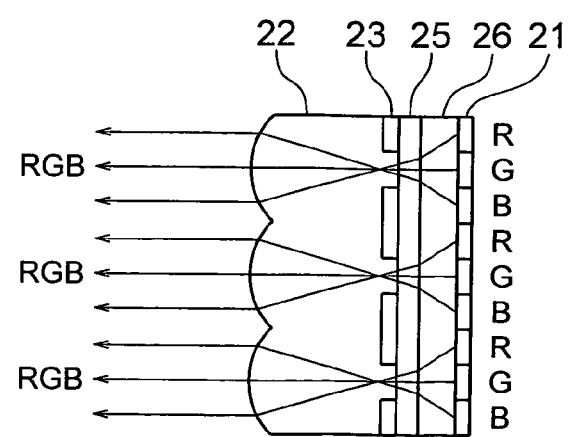
FIG. 23B is a diagram showing a cross-sectional structure thereof.

FIG. 23A and FIG. 23B show a cross-sectional structure of the second modified embodiment of the ninth embodiment. In a second modified embodiment of the ninth embodiment, a case in which a thickness of the spacer 24 cannot be secured sufficiently will be described. In this case, a diffuser 26 as shown in FIG. 23A and FIG. 23B, is used instead of the spacer.

FIG. 23A is a perspective view when the diffuser 26 is used. FIG. 23B is a diagram showing a cross-sectional structure. The diffuser 26 includes a scattering surface 25, on which micro concavities and convexities (projections and recesses) are formed randomly. By using the diffuser 26, it is possible to make lights of R, G, and B incident on one aperture.

Here, the scattering surface 25 may by formed on a surface of the diffuser 26 on the side of the aperture group 23 or may be formed on a surface of the diffuser 26 on the opposite side of the aperture group 23. Moreover, the scattering surface 25 and the diffuser 26 may be formed integrally.

Figure 24:
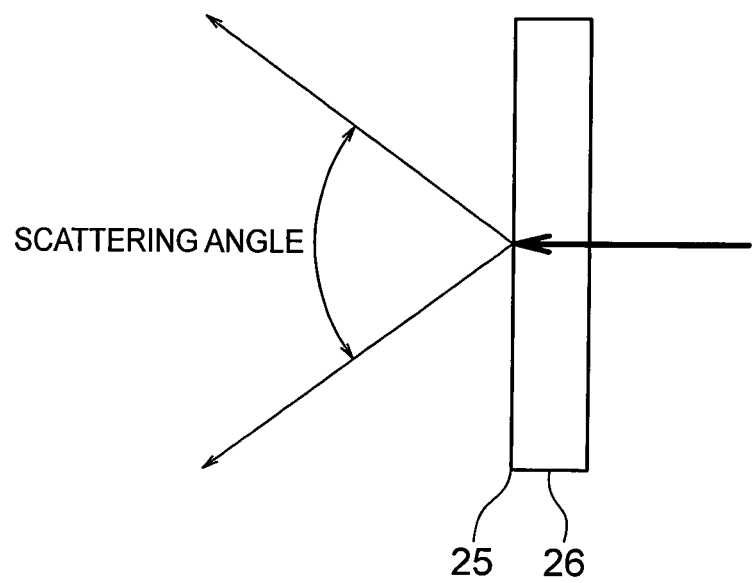
FIG. 24 is a diagram explaining a scattering angle of a scattering surface of a diffuser 26.

FIG. 24 is a diagram explaining a scattering angle of a scattering surface of the diffuser 26. When the degree of diffusion of the information pixels 21 of the display device is small, a surface contact with the information pixel 21 may be the scattering surface. Here, for using an amount of light effectively, it is desirable that the scattering angle of the scattering surface of the diffuser 26 is 10° or smaller. In the present patent specification, the scattering angle is the angle at which a scattering intensity (intensity of scattering) becomes a half value. As a matter of course, the diffuser 26 may be made of a scattering substance.

As mentioned above, the first modified embodiment of the ninth embodiment includes the spacer 24, and the second modified embodiment of the ninth embodiment includes the diffuser 26. Therefore, in both these modified embodiments, an operation and an effect which are the same as that of the ninth embodiment are achieved.

(Tenth Embodiment)

Figure 25A:
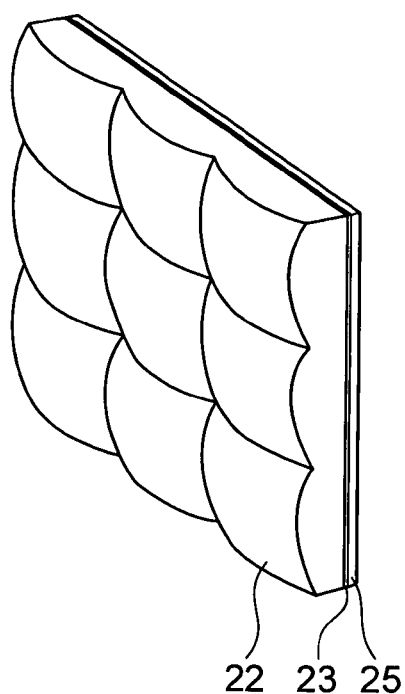
FIG. 25A is a diagram showing a display unit according to a tenth embodiment of the present invention.
Figure 25B:
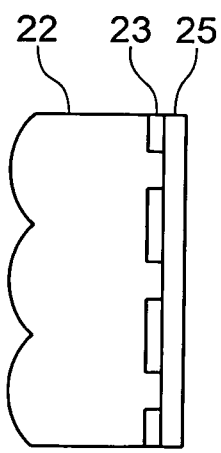
FIG. 25B is a diagram showing a cross-sectional structure of the display unit.

FIG. 25A is a diagram showing a display unit according to a tenth embodiment of the present invention. FIG. 25B is a diagram showing a cross-sectional structure of the display unit. As shown in FIG. 25A and FIG. 25B, the display unit according to the tenth embodiment includes the micro lens array 22, the aperture group 23, and the scattering surface 25. The display unit according to the tenth embodiment is used by mounting on a display device which is not shown in the diagram. A typical display device is a flat panel display such as a liquid crystal display and an OEL (organic electro-luminescence) display. Since the display unit according to the tenth embodiment includes the scattering surface 25, operational advantages similar to those of the ninth embodiment are achieved.

Namely, when the display device installed on the display unit has a protective glass, a thick diffuser is not necessary. It is preferable that an aperture portion of the aperture group 23 is the scattering surface 25. Moreover, for using the amount of light effectively, it is desirable that the scattering angle is 10° or smaller.

(Eleventh Embodiment)

Hereinafter, a display apparatus according to an eleventh embodiment of the present invention will be described as below.

Figure 26:
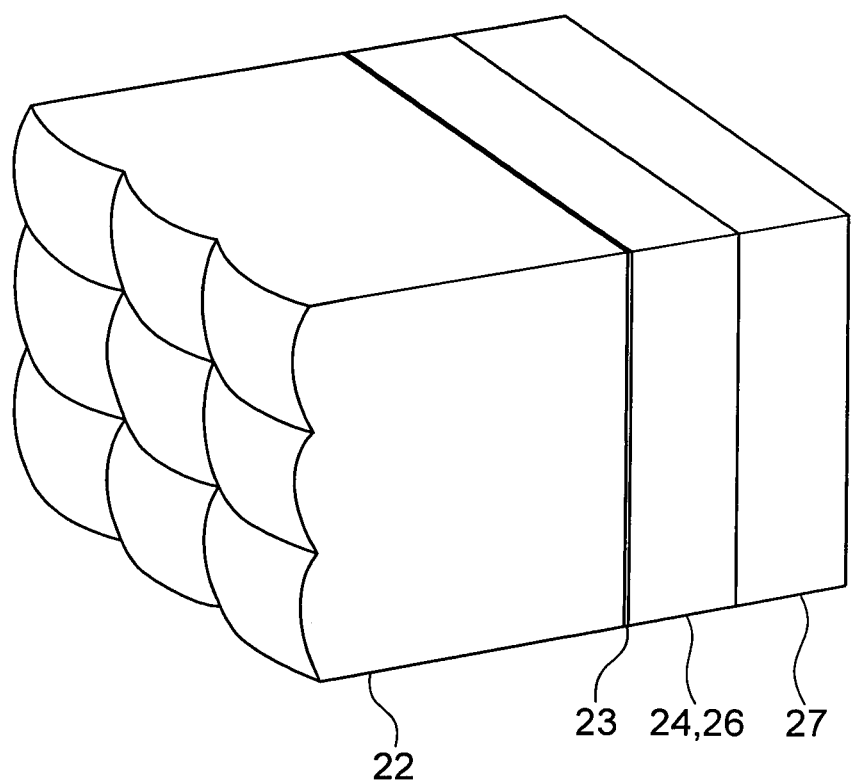
FIG. 26 is a diagram showing a schematic structure of a display apparatus according to an eleventh embodiment.

FIG. 26 is a diagram showing a schematic structure of a display apparatus according to the eleventh embodiment. Normally, there is a large number of lenses, but here, only 3×3 lenses are shown.

The display apparatus includes the micro lens array 22, the aperture group 23, the spacer 24, and a display device 27. A typical display device is a flat panel display such as a liquid crystal display and an OEL display.

The lenses in the micro lens array 22 have an operation and an effect of the lenses 2a, 2b, and 2c which have been described in FIG. 16, which is a diagram for explaining the display principle. The apertures in the aperture group 23 have an operation and an effect of the apertures 1a, 1b, and 1c. The diffuser 26 may be used instead of the spacer 24.

Light from an information pixel of the display device 27 progresses during diverging. Then, the light is transmitted to the aperture of the aperture group 23. For using the amount of light from the information pixel effectively and transmitting image information of the information pixel without loosing as far as possible, it is desirable that a diffusion angle of the diffuser 26 is appropriate.

Hereinafter, it will be explained with some numerical examples.

Here, when a distance up to the observer is let to be L and a projection magnification by the lens is let to be m, a distance Fb between the aperture and the lens becomes $Fb=L/m$. Moreover, the focal length F of the lens becomes $Fb\ L/(L+Fb)$.

Let the size of the information pixel of the display device 27 be 0.18 mm×0.18 mm. When the interval of the aperture group 23 is matched with the interval of the information pixel, Pp becomes 0.18 mm. Let the size of the aperture be 10 μm. For making a projected image of 1 mm be incident on the pupil of the observer, the projection magnification of the lens has to be 100 times.

If the distance up to the observer is 300 mm, the focal length of the lens becomes 2.97 mm. The aperture is placed at a rear focal point position 3 mm. In the case of projecting at a point 300 mm from the observer, projection is almost the same as the infinite projection due to the focal length of the lens being small. When an interval between the nearest apertures is let to be 3 μm, the interval becomes 3 mm at the position of the observer.

When the pupil is moved 3 mm, it is possible to see an image by a light beam of a projected image of an adjacent aperture. The lens interval Lp of the micro lens array becomes 0.178 mm from $Lp=Pp(Ff-F)/Ff$. A numerical aperture of the lens in the micro lens array 22 becomes 0.03, and the thickness of the spacer 24 is required to be about 3 mm in order to make light from the information pixel of size 0.18 incident on the lens. When the diffuser 26 is used, it is possible to make the spacer 24 thin. Furthermore, when the diffuser 26 of the scattering angle 10° is used, it is possible to make the spacer 24 thin to about 1 mm.

Let the size of the information pixel of the display device 27 be 0.09 mm×0.09 mm. When the interval of the aperture group 23 is matched with the interval of the information pixel, Pp becomes 0.09 mm. If the size of the aperture is 10 μm, in order to make a projected image of 1.5 mm incident on the pupil of the observer, the projection magnification of the lens is 150 times.

When the distance up to the observer is 300 mm, the focal length of the lens becomes 2.01 mm. In the case of projecting at a point 300 mm from the observer, projection is almost same as the infinite projection due to the focal length of the lens being small. The aperture is to be placed at the rear focal point position 2 mm of the lens. When an interval between the nearest apertures is let to be 30 μm, the interval becomes 4.5 mm at the position of the observer. When the pupil is moved 4.5 mm, it is possible to see an image by a light beam of a projected image of an adjacent aperture.

The lens interval Lp of the micro lens array 22 becomes 0.089 mm from $Lp=Pp(Ff-F)/Ff$. The numerical aperture of the lens in the micro lens array 22 becomes 0.022. For making light from the information pixel of size 0.09 mm incident on the lens, the thickness of the spacer 24 is required to be about 2 mm. When the diffuser 26 is used, it is possible to make the spacer 24 thin. Furthermore, when the diffuser 26 of the scattering angle 10° is used, it is possible to make the spacer 24 thin to about 0.5 mm.

It is possible to apply the abovementioned numerical examples to the display units according to the ninth embodiment and the tenth embodiment.

(Twelfth Embodiment)

Next, a display unit according to a twelfth embodiment of the present invention will be described below.

Figure 27:
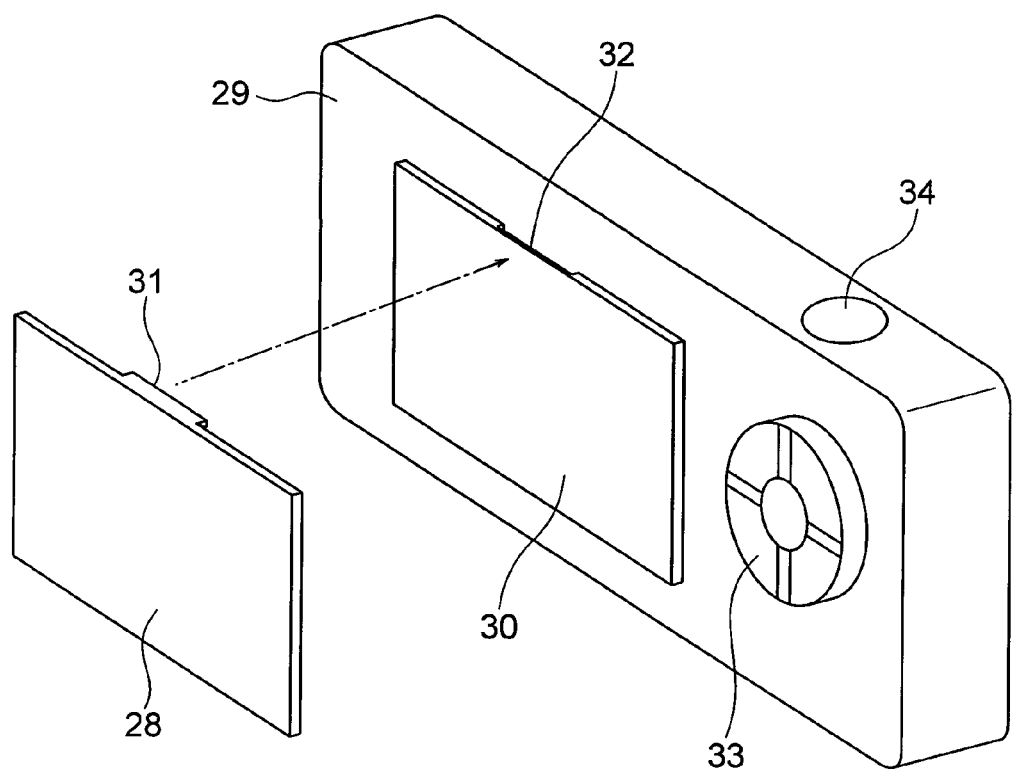
FIG. 27 is a perspective view of a display unit according to a twelfth embodiment.

FIG. 27 is a diagram showing a perspective view of the display unit according to the twelfth embodiment. A display unit 28 has a function of being detachable from an electronic equipment. In the twelfth embodiment, a digital camera is used as an example of the electronic equipment.

A digital camera 29, at a front surface thereof, includes an image pickup lens which is not shown in the diagram. The digital camera 29 includes a release button 34, a mode button 33, and a display device 30. As the display device 30, a liquid crystal display or an OEL display is used typically.

The display unit 28 having hooks for installation 31 at an upper side and a lower side. The display unit 28 is an attachment for the digital camera. Installation holes 32 are provided in the digital camera 29 at the positions (upper and lower) corresponding to the hooks for installation 31.

By engaging the hooks for installation 31 with the installation holes 32, it is possible to install the display unit 28 tightly on the display device 30. The hooks for installation 31 are to be made of plastic which is flexible. Accordingly, the display unit 28 is detachable.

When the display unit 28 is installed in the digital camera 29, even a farsighted person due to old age, or a nearsighted person, a or an astigmatic person can see an image or information displayed on the display device 30 without put on or take off glasses. Accordingly, it is possible to see easily not only a focus and a picture composition but also a GUI (graphical user interface). Therefore, it is possible to take a picture by selecting a capture mode of one's choice by the mode button 33.

By installing the display unit 28 as an attachment to the digital camera 29, it is possible to use the original function.

The detaching mechanism shown here is effective to be detachable not only from an image pickup apparatus other than a display device and a digital camera but also from an electronic equipment including a mobile electronic equipment such as a mobile telephone. Moreover, it is needless to mention that any other mechanism other than the detachable mechanism, which gives a similar operation and effect may be used.

(Thirteenth Embodiment)

Next, an image pickup apparatus according to a thirteenth embodiment of the present invention will be described below.

Figure 28:
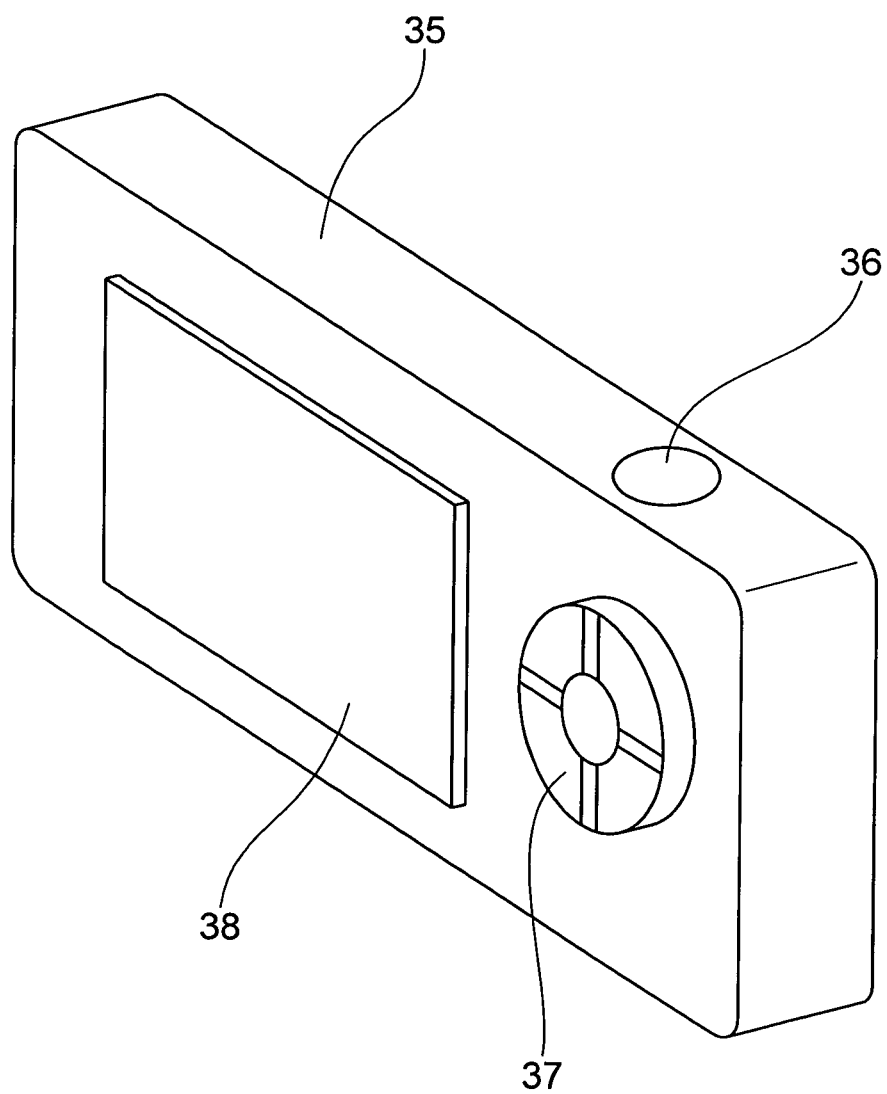
FIG. 28 shows a digital camera which is an example of an image pickup apparatus.

FIG. 28 shows a digital camera which is an example of an image pickup apparatus. A digital camera 35, at a front surface thereof, includes an image pickup lens which is not shown in the diagram. The digital camera 35 has a release button 36, a mode button 37, and a display apparatus 38.

A user takes a picture by pressing the release button 36 while seeing an image which has been picked up by the image pickup lens on the display 38. In the thirteenth embodiment, the display unit shown in diagrams such as FIG. 26 is to be used as the display unit 38. As a matter of course, it is also possible to use the display unit according to any of the abovementioned embodiments.

Consequently, even a nearsighted person, a farsighted person due to old age, or an astigmatic person is capable of checking an image which has been displayed without put on or take off glasses. Furthermore, it is also possible to see a focus and a picture composition. Moreover, it is also possible to see a GUI. Therefore, it is possible to take a picture by selecting a capture mode of once choice by the mode button 37.

A mode button is a type of a switch for setting capture conditions such as, a capture sensitivity, and a scene mode and a night-view mode. The mode button also includes a zoom lever (a switch for operating zooming) which is not shown in the diagram. Here, only one mode button is shown, but there are cases in which a plurality of mode buttons is provided.

(Fourteenth Embodiment)

Next, a mobile electronic equipment according to a fourteenth embodiment of the present invention will be described below.

Figure 29:
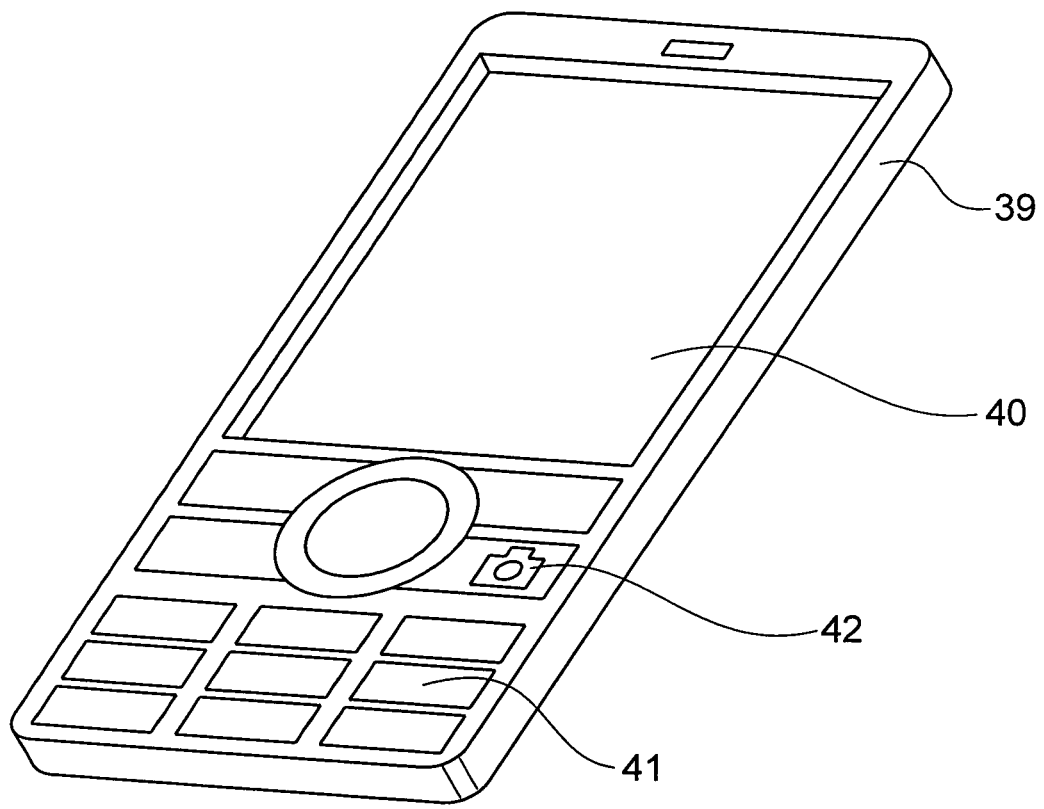
FIG. 29 shows a mobile telephone as an example of a mobile electronic equipment.

FIG. 29 shows a mobile telephone as an example of the mobile electronic equipment. A mobile telephone 39 includes a switch for conversation, a numerical keypad 41 for inputting characters, and a display apparatus 40. The mobile telephone 39 includes not only a telephone but also a display apparatus for acquiring information by mail and the Internet connection.

The mobile telephone 39 according to the fourteenth embodiment uses the display apparatus described in FIG. 26 as a display apparatus 40. Therefore, even a farsighted person, a nearsighted person, or an astigmatic person can see information displayed on the display apparatus in a focused state without using or no using glasses. Consequently, it is possible not only to make a telephone call but also to send a mail.

Moreover, by pressing a camera-mode switch 42, it is possible to capture a photo by a camera not shown in the diagram, which is provided integrally in the mobile telephone 39. Even a farsighted person due to old age, a nearsighted person, or an astigmatic person can see a photo after seeing a focus and a picture composition without put on or take off reading glasses. In other words, since the mobile telephone 39 includes a monitor (the display apparatus 40) on which even a farsighted person due to old age, a nearsighted person, or an astigmatic person can check the display without using glasses, it is possible to use a function which has been added to the mobile telephone.

Furthermore, in addition to the above-mentioned description, the mobile telephone 39 uses an OEL (organic electroluminescence device) of a pixel structure having the micro lens array and the light exit points described in FIG. 6, as the display apparatus 4. Even a farsighted person due to old age, a nearsighted person, or an astigmatic person can see information displayed on the display apparatus in a state of being focused without put on or take off the glasses.

The display apparatus and the electronic equipment using the display apparatus according to the present invention have an effect that a focal depth of an eye is increased by making a light beam incident on the pupil of the observer smaller than the diameter of the pupil. As a result, it is possible to provide the display apparatus and the electronic equipment in which even a person who is not capable of focusing at a display position could see a focused display.

When the display unit, the display apparatus, or the electronic equipment of the present invention is used, even a farsighted person due to old age is able to see a focused display without using reading glasses. Furthermore, the display unit, the display apparatus, or the electronic equipment of the present invention reduces a load on eyes of a farsightedness observer, thereby making it possible for the farsightedness observer to observe without using reading glasses or any other optical material.

Accordingly, even a farsighted person due to old age is capable of seeing a display in a focused form (a focused display) of a mobile equipment such as a mobile telephone, a digital camera, and an electronic book, and monitor screens such as a car navigation system and a personal computer. Furthermore, even a farsightedness person, and a nearsighted person are able to see a focused image (any information displayed, such as pictures and characters) without put on or take off glasses. As a result, in the electronic equipment according to the present invention, even a farsighted person due to old age, a nearsighted person, or an astigmatic person who is not able to see a display in the normal electronic equipment, is able to recognize display contents by a focused display, and to operate the electronic equipment accurately.

Moreover, the present invention can take various modified embodiments which fairly fall within the basic teaching herein set forth.

As it has been described above, the display apparatus, and the display unit, the electronic equipment, the mobile telephone, and the image pickup apparatus using the same, according to the present invention are useful in a mobile equipment such as a mobile telephone, a digital camera, and an electronic book.

The present invention is useful for a display unit, a display apparatus, and an electronic equipment in which, focusing is easy.

According to the present invention, an effect is shown that it is possible to provide the display apparatus, the display unit, the electronic equipment, the mobile telephone, and the image pickup apparatus in which a focused image can be seen even without using reading glasses.

What is claimed is:

1. A display apparatus comprising:
a plurality of light exit point groups; and
a plurality of lenses which projects the plurality of light exit point groups,
wherein at least one of the plurality of light exit point groups includes at least one light exit point, and each lens of the plurality of lenses is disposed such that an image of the plurality of light exit point groups is projected to be overlapped, and a projected image of the plurality of lenses is formed on a retina of an eye of an observer by causing overlapping of the at least one light exit point in the plurality of light exit point groups, which have been projected by the plurality of lenses to be overlapped, incident on a pupil of the eye of the observer.

2. The display apparatus according to claim 1, wherein an interval Pp of the light exit point group and an interval Lp of the lenses satisfy the following expression (1-1)

$$Lp/Pp=(Ff-F)/Ff \quad (1-1)$$

where,
Ff denotes a distance between the lens and an image of the light exit point group, and
F denotes a focal length of the lens.

3. The display apparatus according to claim 1, wherein a distance Ff between the image of the light exit point group and the lens satisfy the following conditional expression (1-2)

$$-L/2 \leq Ff \leq \infty \quad (1-2)$$

where,
L denotes a distance between the lens and a lens of the eye of the observer.

4. The display apparatus according to claim 1, wherein a size of the image of the light exit point projected by the lens in the plurality of lenses is smaller than a diameter of the pupil of the eye of the observer.

5. The display apparatus according to claim 1, wherein the plurality of lenses forms a micro lens array.

6. The display apparatus according to claim 5, wherein a tilt of the light exit point group and a tilt of the micro lens array is within a size of the lens over an area of display.

7. The display apparatus according to claim 1, wherein the light exit point group includes light exit points which emit lights of at least three colors.

8. The display apparatus according to claim 1, comprising:
information pixels which include sub-information pixels of different colors, wherein
the lenses are provided corresponding to the sub-information pixels.

9. The display apparatus according to claim 1, wherein a plurality of sub-information pixels constitutes one light exit point group, and associated with one lens so that light exit points of sub-information pixels of different colors are overlapped in a projected image.

10. The display apparatus according to claim 7, wherein the three colors include red, green, and blue.

11. The display apparatus according to claim 9, wherein
the information pixel includes sub-information pixels of three repetitive colors, and
the number of sub-information pixels which constitutes the light exit point group is either two or four.

12. The display apparatus according to claim 9, wherein
the information pixel includes sub-information pixels of three colors in different order, and
the number of sub-information pixels which constitutes the light exit point group is three.

13. The display apparatus according to claim 5, wherein a effective dimension of the micro lens array is either same as or larger than a effective dimension of a display device having the display pixel.

14. The display apparatus according to claim 8, wherein a shape of the sub-information pixel is rectangular.

15. The display apparatus according to claim 11, wherein one lens is provided for two sub-information pixels.

16. The display apparatus according to claim 12, wherein one lens is provided for three sub-information pixels.

17. The display apparatus according to claim 11, wherein one lens is provided for four sub-information pixels.

18. The display apparatus according to claim 9, wherein a size of an image of the light exit point is in a range of 0.5 mm to 2.8 mm.

19. The display apparatus according to claim 5, wherein a diameter of the lens is not less than 50 μm.

20. The display apparatus according to claim 8, wherein a liquid crystal display device is used for the information pixel.

21. The display apparatus according to claim 20, wherein a light source of the liquid crystal display device is either an LED or an LD.

22. The display apparatus according to claim 8, wherein an organic electro-luminescence device is used for the information pixel.

23. An electronic equipment comprising:
a display apparatus according to claim 1.

24. A mobile electronic equipment comprising:
a display apparatus according to claim 1.

25. A mobile telephone comprising:
a display apparatus according to claim 1.

26. The mobile telephone according to claim 25, comprising:
a mail function.

27. The mobile telephone according to claim 25, comprising:
a camera function.

28. An image pickup apparatus comprising:
a display apparatus according to claim 1.

29. The image pickup apparatus according to claim 28, comprising:
a switch for setting conditions for taking a photo.

30. A display unit comprising:
a plurality of aperture groups; and
a plurality of lenses which projects the aperture groups,
wherein at least one of the plurality of aperture groups has at least one aperture, and each lens of the plurality of lenses is disposed such that an image of the plurality of aperture groups is projected to be overlapped, and a projected image of the plurality of lenses is formed on a retina of an eye of an observer by causing overlapping of the at least one aperture in the plurality of aperture groups which have been overlapped upon being projected by the plurality of lenses, incident on a pupil of the eye of the observer.

31. The display unit according to claim 30, wherein an interval Pp of the aperture groups and an interval Lp of the lenses satisfy the following expression (1-3)

$$Lp/Pp=(Ff-F)/Ff \qquad (1\text{-}3)$$

where,
Ff denotes a distance between the lens and an image of the aperture group, and
F denotes a focal length of the lens.

32. The display unit according to claim 30, wherein a size of the aperture which is projected by the lens in the plurality of lenses is smaller than a diameter of the pupil of the eye of the observer.

33. The display unit according to claim 30, wherein the plurality of lenses constitutes a micro lens array.

34. The display unit according to claim 33, wherein a tilt of the aperture group and a tilt of the micro lens array is within one pixel over an area of display.

35. The display unit according to claim 33, wherein the aperture group is integrated with the micro lens array.

36. The display unit according to claim 33, wherein a diameter of the lens of the micro lens array is not less than 50 μm.

37. The display unit according to claim 35, wherein the aperture group is formed by printing on one surface of the micro lens array.

38. The display unit according to claim 35, wherein the aperture is formed by etching on a flat surface of the micro lens array.

39. The display unit according to claim 33, wherein
the aperture groups and the lenses are disposed at the same interval, and
the micro lens array is a combined micro lens array having a function of a field lens which overlaps projected images of the respective aperture groups.

40. The display unit according to claim 30, wherein a size of the image of the aperture is in a range of 0.5 mm to 2.8 mm.

41. The display unit according to claim 30, comprising:
a mechanism which is detachable from a display device which displays an image by a plurality of information pixels.

42. The display unit according to claim 30, comprising:
a mechanism which is detachable from an electronic equipment.

43. The display unit according to claim 30, comprising:
a mechanism which is detachable from a mobile electronic equipment.

44. The display unit according to claim 30, comprising:
a mechanism which is detachable from a mobile telephone.

45. The display unit according to claim 30, comprising:
a mechanism which is detachable from an image pickup apparatus.

46. The display unit according to claim 30, wherein a scattering characteristic is imparted to an aperture portion of the aperture.

47. The display unit according to claim 46, wherein a scattering angle of a scattering surface is not more than 10°.

48. The display unit according to claim 30, further comprising:
a spacer, wherein
the plurality of aperture groups is illuminated via the spacer.

49. The display unit according to claim 48, wherein
the plurality of lenses constitutes a micro lens array, and
a tilt of the aperture group and a tilt of the micro lens array is within a size of the lens over an area of display.

50. The display unit according to claim 48, wherein
the plurality of lenses constitutes a micro lens array, and
the aperture is formed by printing on a flat surface of the spacer or the micro lens array.

51. The display unit according to claim 48, wherein
the plurality of lenses constitutes a micro lens array, and
the aperture is formed by etching in a flat surface of the spacer or the micro lens array.

52. The display unit according to claim 48, wherein the spacer is a diffuser.

53. The display unit according to claim 52, wherein a scattering angle of the diffuser is not more than 10°.

54. A display apparatus comprising:
a display unit according to claim 46; and
a display device which displays an image by a plurality of information pixels, wherein
the information pixels illuminate the aperture group via the spacer.

55. The display apparatus according to claim 54, wherein an interval of the information pixels of the display device is not more than 0.3 mm.

56. The display apparatus according to claim 55, wherein the information pixels of the display device include sub-information pixels including at least three colors which are red, green, and blue.

57. The display apparatus according to claim 56, wherein a pixel interval of sub-information pixels is not more than 0.1 mm.

58. The display apparatus according to claim 54, wherein the display device is a liquid crystal device.

59. The display apparatus according to claim 54, wherein the display device is an organic electro-luminescence device.

60. An electronic equipment comprising:
a display apparatus according claim 54.

61. A mobile electronic equipment comprising:
a display apparatus according to claim 54.

62. A mobile telephone comprising:
a display apparatus according to claim 54.

63. The mobile telephone according to claim 62, comprising:
a mail function.

64. The mobile telephone according to claim 62, comprising:
a camera function.

65. An image pickup apparatus comprising:
a display apparatus according to claim 54.

66. The image pickup apparatus according to claim 65, comprising:
a switch for setting conditions for taking a photo.

* * * * *